US012723452B2

(12) United States Patent
Hammerer

(10) Patent No.: US 12,723,452 B2
(45) Date of Patent: Sep. 1, 2026

(54) METHOD FOR MOVING AT LEAST ONE DOOR LEAF

(71) Applicant: Julius Blum GmbH, Hoechst (AT)

(72) Inventor: Andre Hammerer, Alberschwende (AT)

(73) Assignee: JULIUS BLUM GMBH, Hoechst (AT)

( * ) Notice: Subject to any disclaimer, the term of this patent is extended or adjusted under 35 U.S.C. 154(b) by 326 days.

(21) Appl. No.: 18/134,836

(22) Filed: Apr. 14, 2023

(65) Prior Publication Data

US 2023/0258034 A1 Aug. 17, 2023

Related U.S. Application Data

(63) Continuation of application No. PCT/AT2021/060374, filed on Oct. 13, 2021.

(30) Foreign Application Priority Data

Oct. 22, 2020 (AT) .............................. A 50914/2020

(51) Int. Cl.
*E05D 15/58* (2006.01)
*E05D 15/26* (2006.01)

(52) U.S. Cl.
CPC ........... *E05D 15/58* (2013.01); *E05D 15/264* (2013.01); *E05D 2015/586* (2013.01); *E05Y 2900/212* (2013.01)

(58) Field of Classification Search
CPC . E05D 15/58; E05D 2015/586; E05D 15/264; E05Y 2201/47; E05Y 2201/626;
(Continued)

(56) References Cited

U.S. PATENT DOCUMENTS 5,131,449 A * 7/1992 Winn .................... E06B 3/5045 160/214
7,959,242 B2 6/2011 Del Castillo
(Continued)

FOREIGN PATENT DOCUMENTS

AT 523167 6/2021
AT 523872 12/2021
(Continued)

OTHER PUBLICATIONS

International Search Report issued Jan. 19, 2022 in International (PCT) Application No. PCT/AT2021/060374.

*Primary Examiner* — Hiwot E Tefera
(74) *Attorney, Agent, or Firm* — Wenderoth, Lind & Ponack, L.L.P.

(57) ABSTRACT

A method of moving a door leaf relative to a stationary furniture carcass includes pivoting the door leaf away from a receiving space starting from the closed position using a first ejection device. The door leaf is then moved into a partly open position, and then out of the partly open position into the open position, wherein at least one drive device and a second ejection device are loaded. Then, the door leaf is ejected in the direction of the partly open position starting from the open position by a second ejection device, after which the door leaf is moved into the partly open position by the drive device. The door leaf is then moved from the partly open position to the closed position, wherein the first ejection device is loaded.

17 Claims, 15 Drawing Sheets

(58) Field of Classification Search

CPC ......... E05Y 2201/654; E05Y 2201/684; E05Y 2201/694; E05Y 2800/102; E05Y 2900/212; E05F 1/10; E06B 3/5045

See application file for complete search history.

(56) References Cited

U.S. PATENT DOCUMENTS

| | | | | |
|---|---|---|---|---|
| 10,227,806 | B2 * | 3/2019 | Gabl | E05D 15/58 |
| 10,316,565 | B2 | 6/2019 | Gabl | |
| 10,400,493 | B2 | 9/2019 | Gabl | |
| 10,753,133 | B2 | 8/2020 | Kohlweiss | |
| 11,008,791 | B2 | 5/2021 | Rupp et al. | |
| 11,274,482 | B2 | 3/2022 | Rupp et al. | |
| 11,536,069 | B2 | 12/2022 | Kohlweiss et al. | |
| 2004/0239216 | A1 | 12/2004 | Castillo | |
| 2013/0232878 | A1 * | 9/2013 | Bortoluzzi | E05D 15/58 49/252 |
| 2015/0008811 | A1 * | 1/2015 | Ishii | E06B 3/5045 312/322 |
| 2015/0084492 | A1 * | 3/2015 | Braungart | E05D 15/264 312/319.2 |
| 2015/0300075 | A1 * | 10/2015 | Lyons | E05D 15/58 49/177 |
| 2017/0241178 | A1 | 8/2017 | Gabl | |
| 2017/0247924 | A1 * | 8/2017 | Gabl | E05F 3/227 |
| 2017/0260789 | A1 | 9/2017 | Gabl | |
| 2018/0119470 | A1 | 5/2018 | Kohlweiss | |
| 2019/0284859 | A1 | 9/2019 | Rupp et al. | |
| 2019/0301218 | A1 | 10/2019 | Rupp et al. | |
| 2019/0330896 | A1 * | 10/2019 | Rupp | E05D 15/264 |
| 2020/0018106 | A1 * | 1/2020 | Rupp | E05D 15/266 |
| 2020/0018107 | A1 * | 1/2020 | Rupp | E05F 3/14 |
| 2020/0018108 | A1 * | 1/2020 | Sperger | E05D 15/58 |
| 2020/0048946 | A1 * | 2/2020 | Blum | E05D 15/26 |
| 2020/0063482 | A1 | 2/2020 | Kohlweiss et al. | |
| 2020/0157867 | A1 * | 5/2020 | Girotto | E05D 15/58 |
| 2021/0246700 | A1 * | 8/2021 | Hoffmann | E05D 15/58 |
| 2021/0262269 | A1 * | 8/2021 | Goetz | E06B 3/50 |
| 2021/0310293 | A1 * | 10/2021 | Blum | E05D 7/0415 |
| 2022/0056744 | A1 * | 2/2022 | Duer | E05D 15/262 |
| 2022/0056746 | A1 * | 2/2022 | Meusburger | E05F 1/1041 |
| 2022/0307307 | A1 * | 9/2022 | Rupp | E05D 15/58 |
| 2022/0372808 | A1 | 11/2022 | Fink et al. | |
| 2023/0090428 | A1 | 3/2023 | Duer | |

FOREIGN PATENT DOCUMENTS

| | | |
|---|---|---|
| CN | 107002439 | 8/2017 |
| CN | 107002440 | 8/2017 |
| CN | 107735542 | 2/2018 |
| CN | 110199080 | 9/2019 |
| CN | 110621839 | 12/2019 |
| EP | 3 315 701 | 5/2018 |
| JP | 2011-162994 | 8/2011 |
| JP | 2018-502234 | 1/2018 |
| JP | 2018-524501 | 8/2018 |
| JP | 2020-514591 | 5/2020 |
| WO | 2016/081960 | 6/2016 |
| WO | 2016/081961 | 6/2016 |
| WO | 2016/081963 | 6/2016 |
| WO | 2017/000006 | 1/2017 |
| WO | 2018/129572 | 7/2018 |
| WO | 2018/129573 | 7/2018 |
| WO | 2018/204953 | 11/2018 |

* cited by examiner

METHOD FOR MOVING AT LEAST ONE DOOR LEAF

BACKGROUND OF THE INVENTION

The invention relates to a method for moving at least one door leaf relative to a stationary furniture carcass, and the furniture carcass has at least one receiving space and at least one, preferably shaft-shaped, cavity. The at least one door leaf is movable between a closed position, in which the at least one door leaf is arranged in a closing plane and covers the at least one receiving space at least in areas, and an open position, in which the at least one door leaf releases the at least one receiving space and is arranged in an end position in the at least one cavity.

Such a method is already known from the state of the art. A disadvantage in this case is that the movement of the door leaf is associated with a high expenditure of force for a user and the user must apply force from different directions, which leads to a jerky movement sequence.

SUMMARY OF THE INVENTION

The object of the present invention is to remedy these disadvantages at least in part and to specify a method that is improved compared with the state of the art, which is characterized in particular by a harmonious and intuitive movement sequence and a smaller application of force for a user, and thus appreciably increases operating convenience.

In a first method step, the at least one door leaf is pivoted away from the at least one receiving space about an axis of rotation starting from the closed position by means of a first ejection device, which can preferably be activated by an overpressing of the at least one door leaf in the direction of the at least one receiving space, preferably wherein the first ejection device is arranged on the furniture carcass or on the at least one door leaf. The at least one door leaf is moved thereby into an angle position from which the at least one door leaf can be moved further in the direction of the open position in a simple manner for the user.

In a second method step, the at least one door leaf is moved into a partly open position, in which it is arranged substantially transverse to the closing plane and outside of the at least one cavity. In this partly open position, the receiving space is already accessible from outside. Preferably, the at least one door leaf is moved manually into the partly open position in the course of the second method step. This movement is associated with a relatively small expenditure of force from a defined direction.

In a third method step, the at least one door leaf is moved from the partly open position to the open position, wherein at least one drive device and a second ejection device are loaded, and preferably the at least one drive device comprises a cable pull and/or a spring-loaded pivot lever. It makes sense here for the at least one door leaf to be moved manually out of the partly open position into the open position in the course of the third method step. This movement is also an intuitive movement for a user in a defined direction.

As the at least one door leaf is located in the open position, the receiving space is now accessible without obstruction for the user. For example, a kitchen can be arranged in the receiving space. In this case the user can now perform activities that are usually carried out in a kitchen.

If the user then wishes to close the receiving space again, the at least one door leaf is thus ejected in a fourth method step starting from the open position in the direction of the partly open position by means of the second ejection device, which can preferably be activated by an overpressing of the at least one door leaf in the direction of the end position.

In a fifth method step, the at least one door leaf is moved by the at least one drive device into the partly open position. It makes sense here for the at least one door leaf to be moved consecutively and/or simultaneously by at least two drive devices into the partly open position in the course of the fifth method step, wherein the drive devices are loaded in the course of the third method step. For example, a first drive device can be a cable pull, as disclosed in application A 51123/2019 of the applicant, and a second drive device can be a pivot lever draw-in mechanism, as disclosed in application A 50495/2020 of the applicant.

In a sixth method step, the at least one door leaf is moved, preferably by a pivot device and/or manually, from the partly open position into the closed position, wherein the first ejection device is loaded.

In the course of the fourth, fifth and sixth method step, the user must therefore apply no force or only a slight force to move the at least one door leaf back into the closed position.

According to a preferred embodiment, the first ejection device is also formed as a pivot device with which the at least one door leaf can be moved from the partly open position in the direction of the closed position, the pivot device is loaded in the course of the second method step and the at least one door leaf is moved in the course of the sixth method step out of the partly open position into the closed position by means of the pivot device and manually.

To this end the first ejection device can be formed, for example, as disclosed in application A 51116/2019 of the applicant.

It makes sense that at least one damping device is provided with which a movement of the at least one door leaf into the partly open position in the course of the fifth method step is damped. In this way, the at least one door leaf can be braked shortly before the movement into the partly open position to achieve a particularly harmonious change of direction taking place in the partly open position.

It has proved to be advantageous that the at least one door leaf is at least pivoted in the course of the first, second and sixth method step.

Alternatively or additionally, it has proved to be favorable that the at least one door leaf is moved linearly in the course of the third, fourth and fifth method step.

In this context, it makes sense for the at least one door leaf to be mounted, preferably pivotably, on a support and for the support to be displaced in the course of the third, fourth and fifth method step along at least one guide arranged in the at least one cavity.

According to a preferred embodiment, the at least one door leaf is connected in an articulated manner to at least one other door leaf, the door leaves are arranged in a coplanar position in the closed position and substantially parallel to each other in the partly open position as well as in the open position, and the door leaves perform a pivot-slide movement in the course of the first, second and sixth method step.

In this context, it has proved to be advantageous that at least one running rail is arranged on the furniture carcass parallel to the closing plane, and one of the door leaves is connected via a carriage to the at least one running rail and is moved along the at least one running rail in the course of the first, second and sixth method step.

BRIEF DESCRIPTION OF THE DRAWINGS

Further details and advantages of the invention are explained in more detail below by the description of the figures with reference to the drawings, in which.

DETAILED DESCRIPTION OF THE INVENTION

Figure 1:
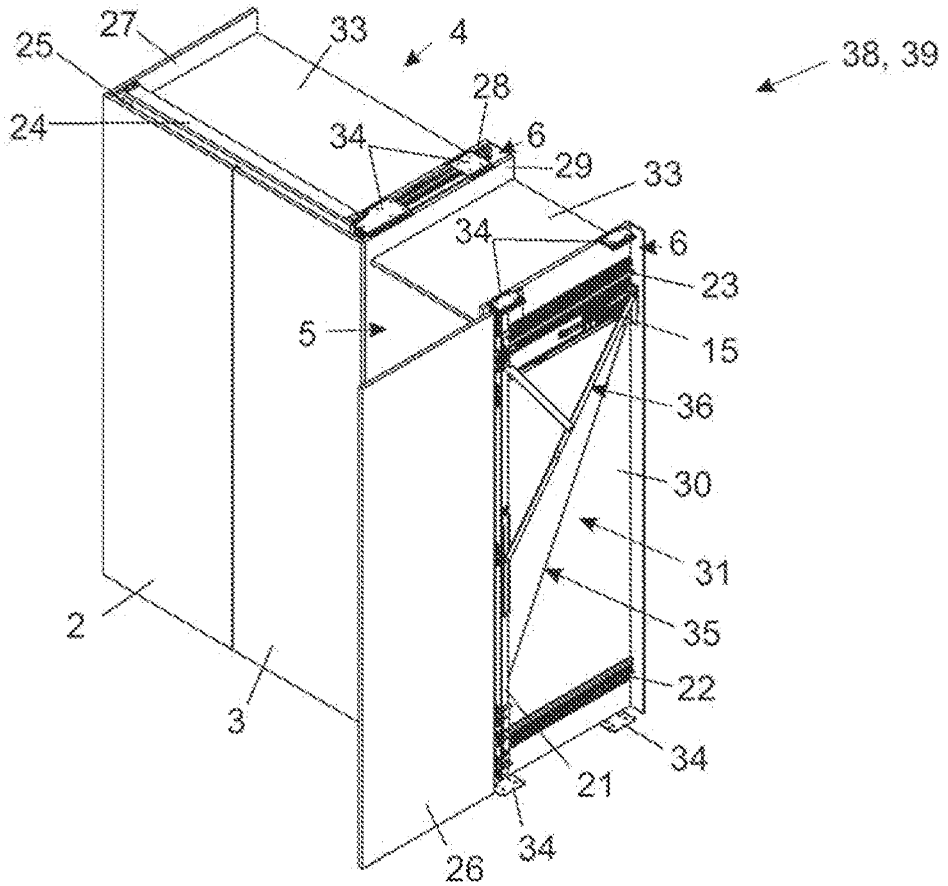
FIG. 1 shows a first piece of furniture with a furniture carcass and door leaves that can be moved relative thereto in a schematically represented perspective view.

FIG. 1 shows a piece of furniture 39 with a movable furniture part, which comprises precisely one door leaf 26, and a piece of furniture 38 connected thereto with a movable furniture part, which comprises two door leaves 2, 3 connected to each other in an articulated manner. Using the movable furniture parts, a receiving space 5, in which kitchen appliances and/or kitchen furniture, for example, can be arranged, can be covered in each case. In this way a concealed kitchen can be realized. The pieces of furniture 38 and 39 can also be regarded as one joint piece of furniture.

Other than represented in FIG. 1, a common interior can also be involved, which can be covered from a first side by the movable furniture part with the door leaf 26 and from a second side by the movable furniture part with the door leaves 2, 3.

The pieces of furniture 38, 39 comprise cavities 6, extending in a depth direction of the pieces of furniture and preferably designed in the form of a shaft, in which the movable furniture parts can be arranged.

The door leaves 2, 3, 26 can be moved between a closed position, in which the door leaves 2, 3, 26 are arranged in a closing plane 7 and cover the receiving space 5 at least in areas, and an open position, in which the door leaves 2, 3, 26 release the receiving space 5 and are arranged in an end position in the cavity 6.

To guide the movable furniture parts in the cavities 6, a guide arrangement is arranged on a furniture wall 28, 30 of a stationary furniture carcass 4 in each case. The guide arrangement can include a first guide 22 and a second guide 23 spaced apart therefrom in a vertical direction.

The door leaves 2, 3, 26 can be mounted, preferably pivotably, on a support 21, wherein the support 21 can be displaced along the guide 22, 23 arranged in the at least one cavity 6.

A compensation device 31 can be provided with which a tilting moment of the door leaves 26, 2, 3 or of the support 21 about a horizontal axis can be compensated for. The compensation device 31 can comprise at least one cable pull 35 and/or a scissor mechanism 36, which is preferably Y-shaped.

Figure 2:
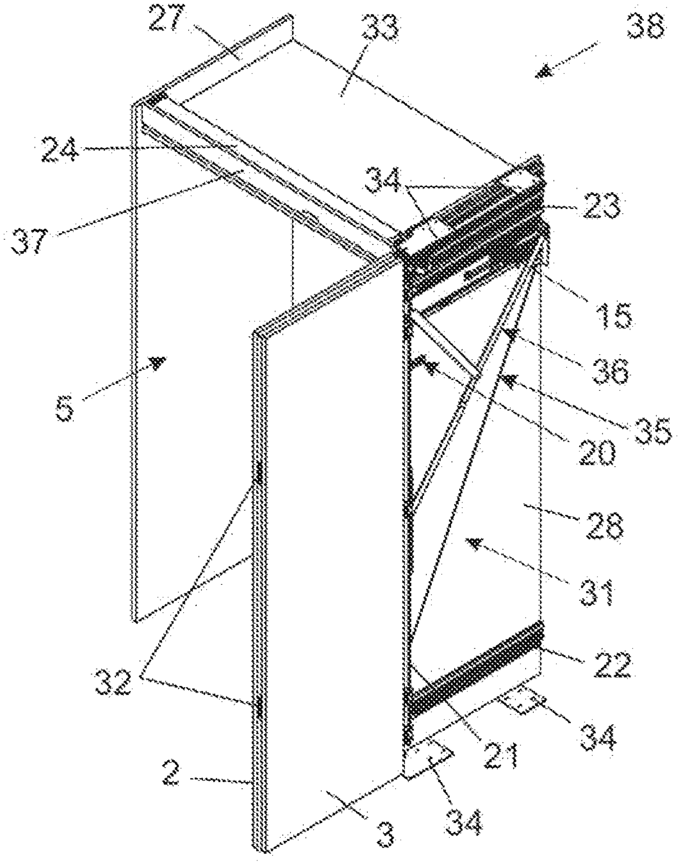
FIG. 2 shows a second piece of furniture with a furniture carcass and door leaves that can be moved relative thereto in a schematically represented perspective view.

FIG. 2 shows a piece of furniture 38 with a movable furniture part, which comprises two door leaves 2, 3 that are connected to each other in an articulated manner. The door leaves 2, 3 are connected to each other in an articulated manner via hinges 32.

Arranged on a top panel 33 of the piece of furniture 38 is at least one running rail 24 parallel to a closing plane 7 of the door leaves 2, 3 (see also FIG. 17), wherein one of the two door leaves 2, 3 of the movable furniture part is mounted displaceably on the running rail 24 via a carriage 25 (see also FIG. 1). The running rail 24 is covered in areas by a panel 37.

The cavities 6 can be formed by side walls 28, 29 and 30, 40, which are spaced respectively apart from each other and arranged substantially parallel to each other, wherein the side walls 28, 29, 30, 40 can be connected to each other via connectors 34.

The receiving spaces 5 can be arranged between the side walls 29 and 30 as well as 28 and another side wall 27.

In addition to the pieces of furniture 38, 39 represented in FIGS. 1 and 2, pieces of furniture are also conceivable which have only one movable furniture part, which comprise precisely one door leaf, or which have more than one movable furniture part. The present invention is described with reference to FIG. 4 and more by way of example and with reference to the pieces of furniture 38 and 39.

Figure 3:
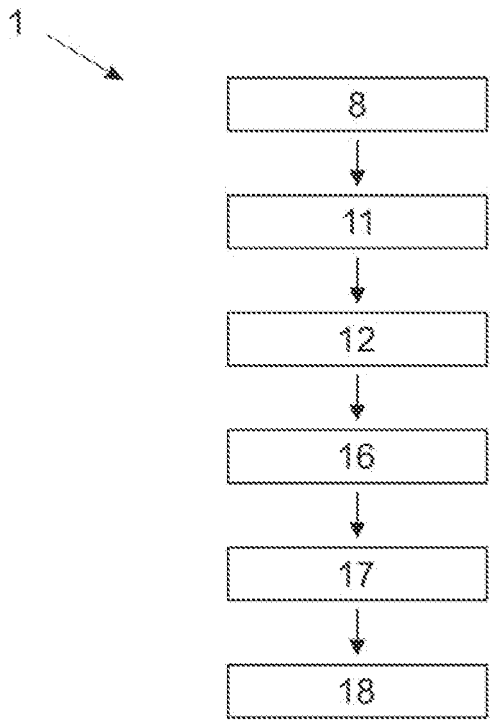
FIG. 3 shows an embodiment of the method for moving at least one door leaf relative to a stationary furniture carcass, represented schematically by means of a flow chart.

FIG. 3 shows an embodiment of the method 1 for moving at least one door leaf 2, 3, 26 relative to a stationary furniture carcass 4, represented schematically by means of a flow chart. The method 1 comprises the following method steps:

In a first method step 8, the at least one door leaf 2, 3, 26 is pivoted away from at least one receiving space 5 about an axis of rotation 10, starting from the closed position, by a first ejection device 9, which can preferably be activated by an overpressing of the at least one door leaf 2, 3, 26 in the direction of the at least one receiving space 5. The first ejection device 9 is preferably arranged on the furniture carcass 4 or on the at least one door leaf 2, 3, 26.

In a second method step 11, the at least one door leaf 2, 3, 26 is moved into a partly open position in which it is arranged substantially transverse to the closing plane 7 and outside of the at least one cavity 6.

In a third method step 12, the at least one door leaf 2, 3, 26 is moved out of the partly open position into the open position, wherein at least one drive device 13, 14 and a second ejection device 15 are loaded, preferably wherein the at least one drive device 13, 14 comprises a cable pull and/or a spring-loaded pivot lever.

In a fourth method step 16, the at least one door leaf 2, 3, 26 is ejected in the direction of the partly open position, starting from the open position, by the second ejection device 15. The second ejection device 15 can preferably be activated by an overpressing of the at least one door leaf 2, 3, 26 in the direction of the end position.

In a fifth method step 17, the at least one door leaf 2, 3, 26 is moved into the partly open position by the at least one drive device 13, 14.

In a sixth method step 18, the at least one door leaf 2, 3, 26 is moved from the partly open position to the closed position, preferably by a pivot device 19 and/or manually, and the first ejection device 9 is loaded.

FIGS. 4 to 16 show another embodiment of the method 1 for moving a door leaf 26 relative to a stationary furniture carcass, represented by a sequence of figures. In each case, a piece of furniture 39 is represented schematically in a top view in an upper part of the figures and force-path diagrams are represented in a lower part.

The piece of furniture 39 comprises a receiving space 5 arranged between the side walls 29 and 30 and a cavity 6 arranged between the side walls 30 and 40.

The door leaf 26 is pivotable about an axis of rotation 10.

In the lower part of the figures, two force-path diagrams are represented in each case, wherein the left-hand diagram shows the effective force 41 during a movement of the door leaf 26 via the pivot angle path 43 between the closed position, in which the door leaf 26 is arranged in the closing plane 7, and the partly open position, in which the door leaf 26 is arranged substantially parallel to the cavity 6. The right-hand diagram shows the effective force 42 during a movement of the door leaf 26 via the travel path 44 between the partly open position and the open position, in which the door leaf 26 is arranged in the end position in the cavity 6.

Figure 4:
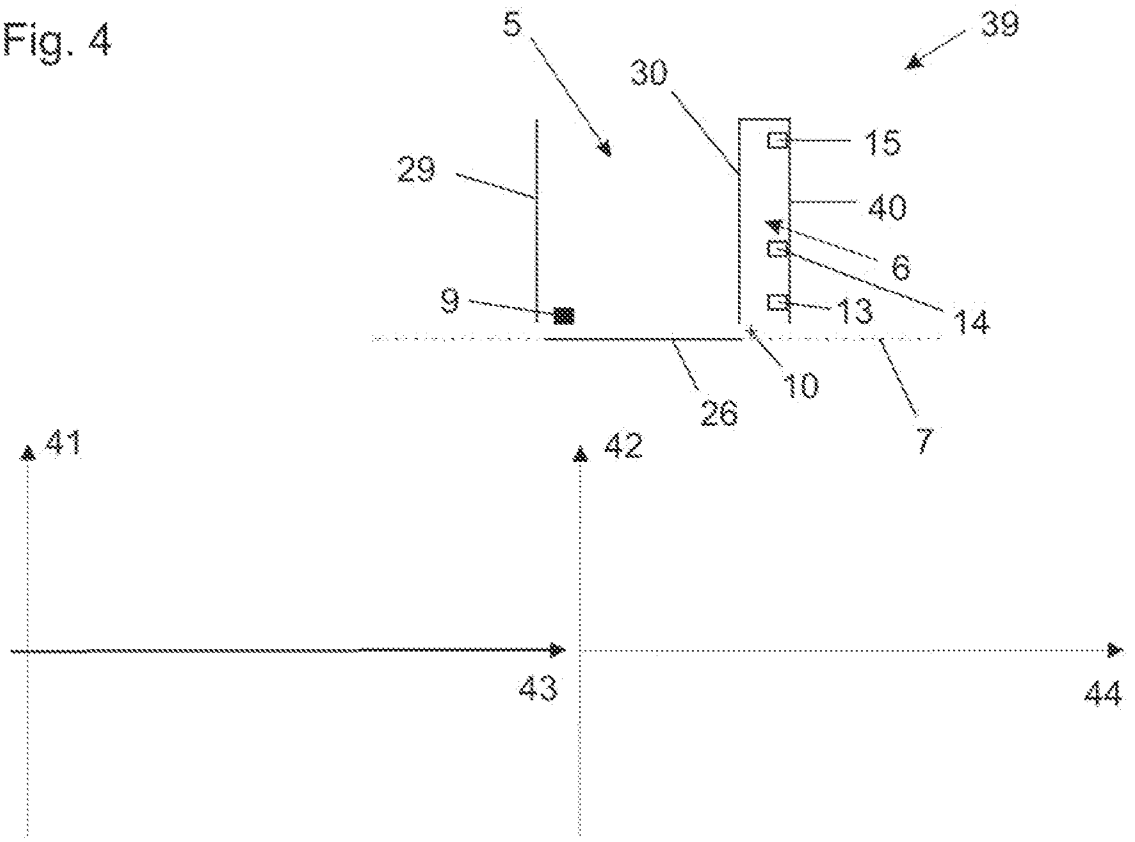
FIG. 4-16 show another embodiment of the method for moving a door leaf relative to a stationary furniture carcass, represented by a sequence of figures, wherein a piece of furniture is represented schematically in each case in a top view in an upper part of the figures and force-path diagrams are represented in a lower part.

In FIG. 4, the closed position of the door leaf 26 is represented. An energy store of the first ejection device 9, which is arranged on the furniture carcass 4 in the case represented, is loaded, which is indicated schematically by means of a rectangle filled with black.

In a first method step 8, the door leaf 26 is pivoted away from the receiving space 5 about an axis of rotation 10, starting from the closed position, by means of the first ejection device 9, which can be activated by an overpressing of the door leaf 26 in the direction of the receiving space 5.

Figure 5:
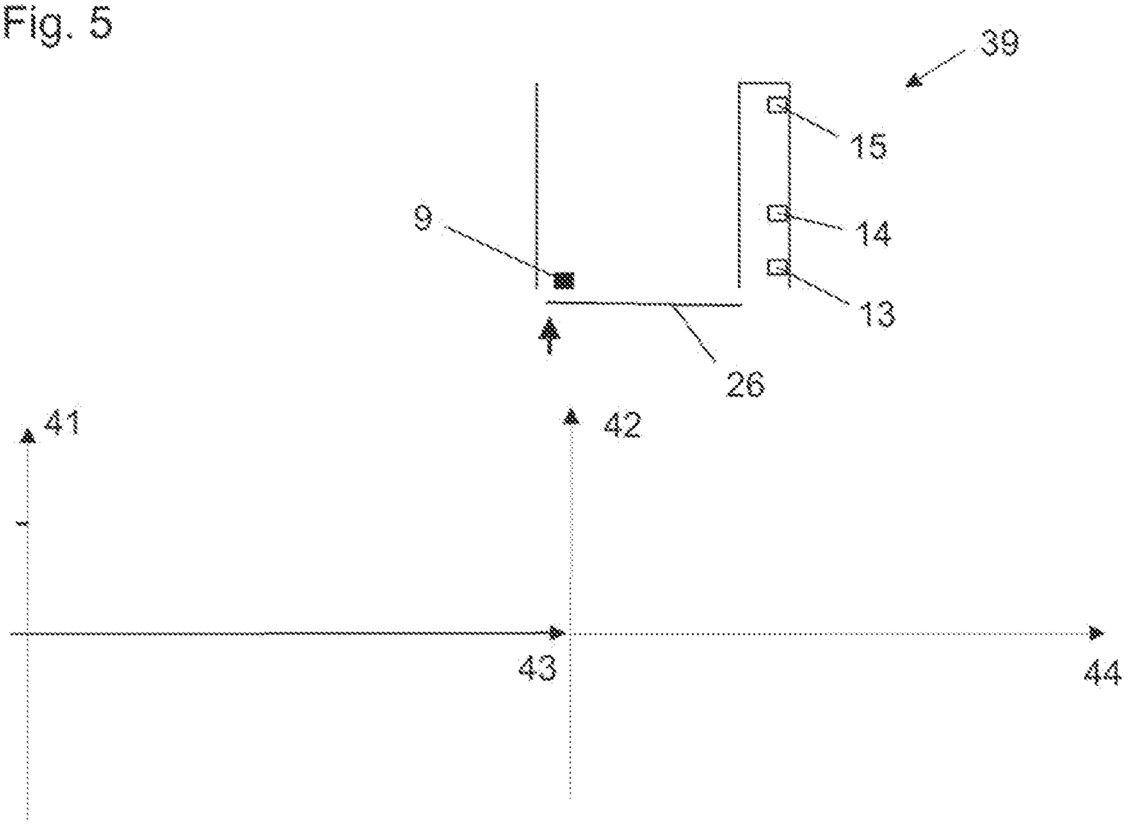
Figure 6:
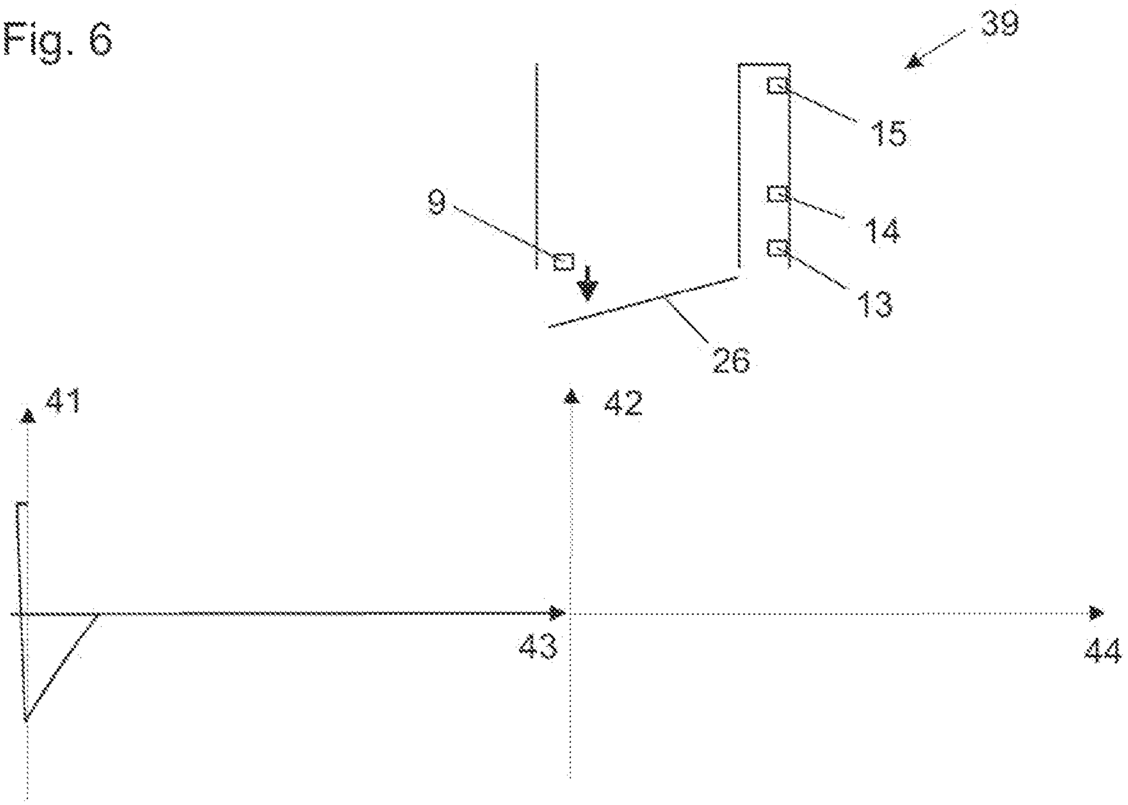

FIG. 5 shows the overpressed position and FIG. 6 the position of the door leaf 26 following ejection. Upon ejection the energy store of the first ejection device 9 is unloaded, which is indicated by the rectangle in FIG. 6 no longer being filled in.

Figure 7:
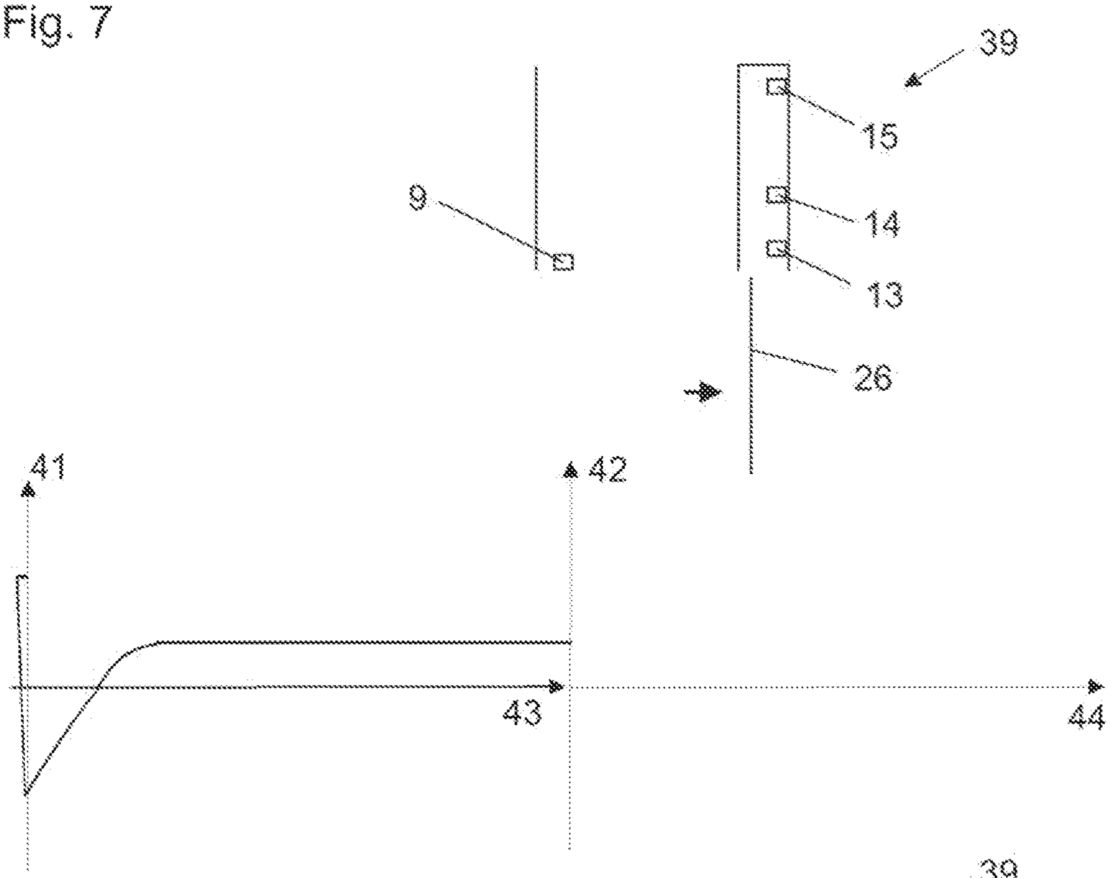
Figure 8:
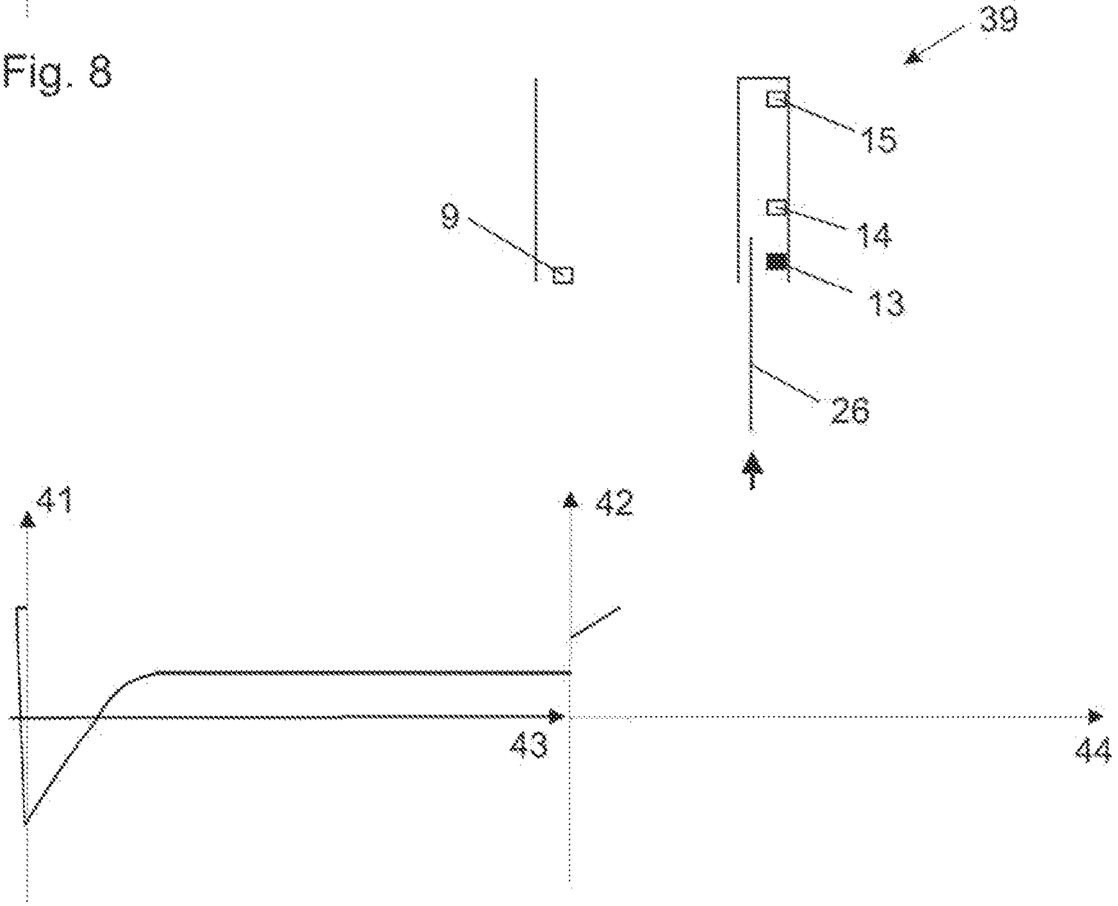
Figure 9:
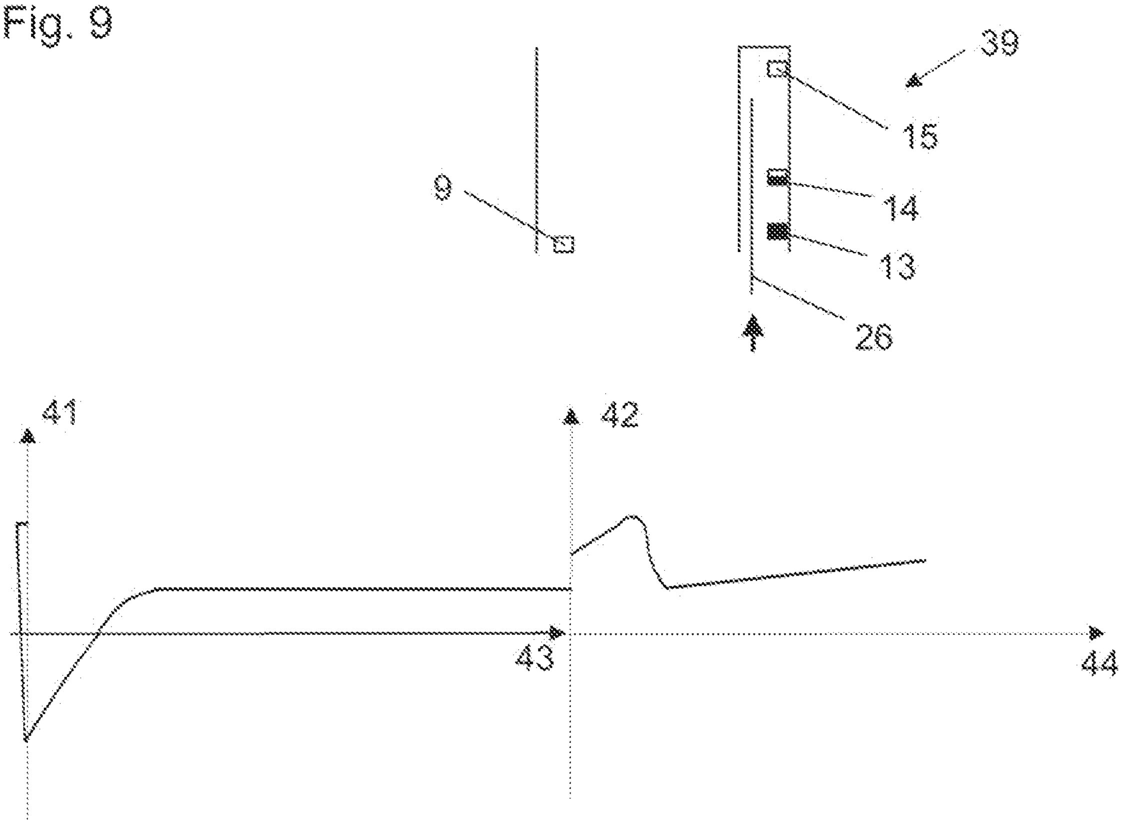

In a second method step 11, the door leaf 26 is moved manually into a partly open position, in which it is arranged substantially transverse to the closing plane 7 and outside of the at least one cavity 6. The partly open position is represented in FIG. 7. All drive devices 9, 13, 14 and 15 provided are unloaded in the partly open position (and corresponding block in FIG. 7 is unfilled). To transfer the door leaf 26 from the ejection position represented in FIG. 6 to the partly open position, the user must apply a force that, after an initial increase, is substantially constant.

In a third method step 12, the door leaf 26 is moved out of the partly open position into the open position, and two drive devices 13, 14 and a second ejection device 15 are loaded. Preferably, the drive device 13 comprises a spring-loaded pivot lever and the drive device 14 comprises a cable pull.

Figure 10:
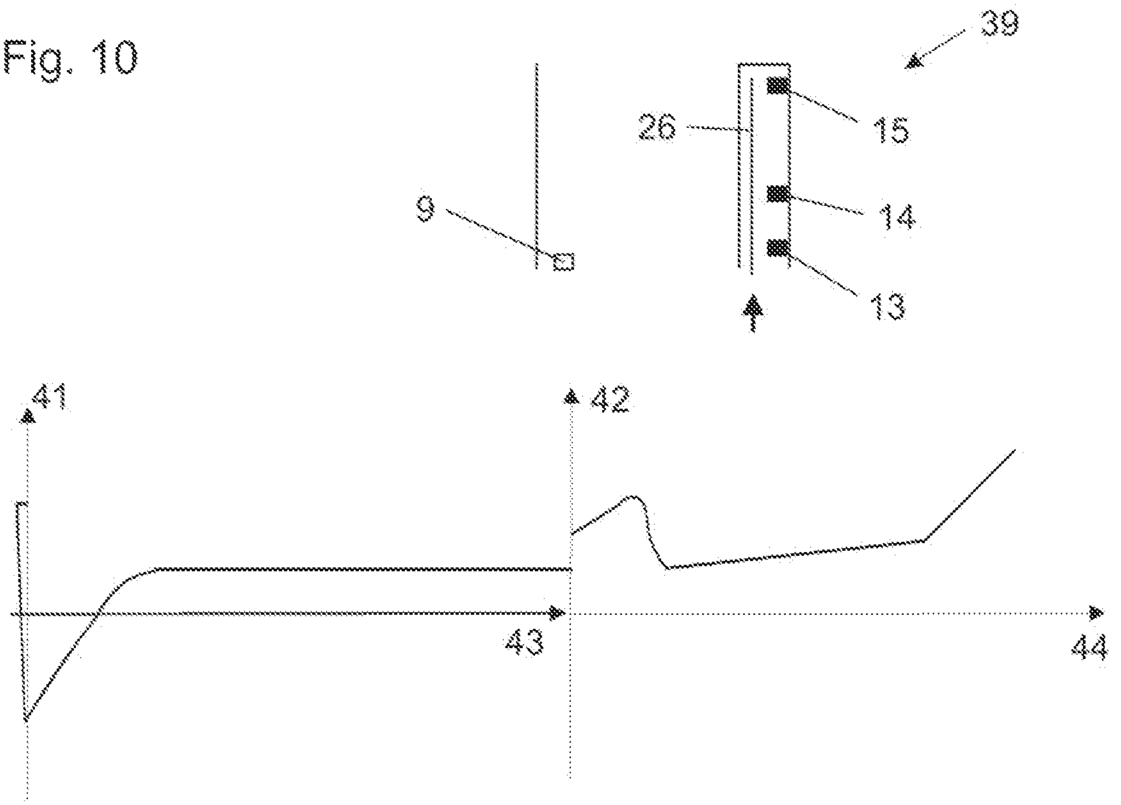

In this case, first an energy store of the drive device 13 is loaded (see FIG. 8), then at least partially an energy store of the drive device 14 (see half-filed block in FIG. 9), and finally an energy store of the second ejection device 15 (see FIG. 10), with the result that in the open position, which is represented in FIG. 10, all drive devices 13, 14 and 15 provided are loaded, with the exception of the first ejection device 9.

Figure 11:
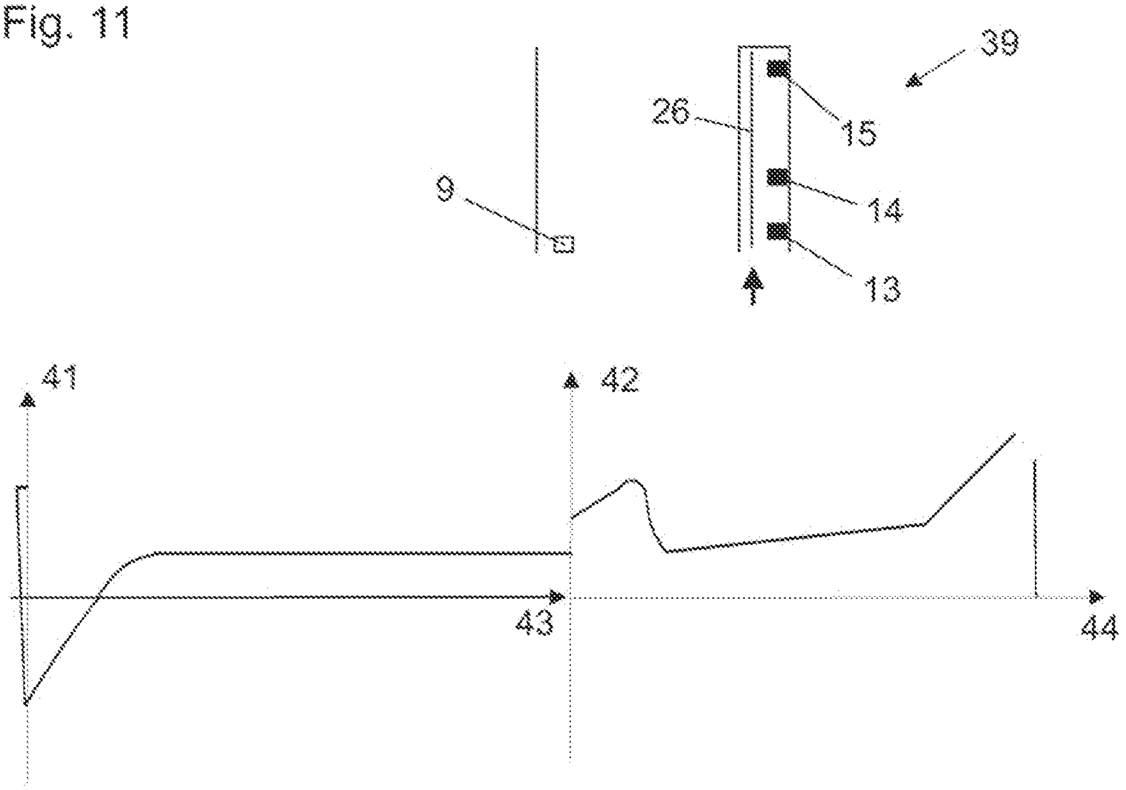
Figure 12:
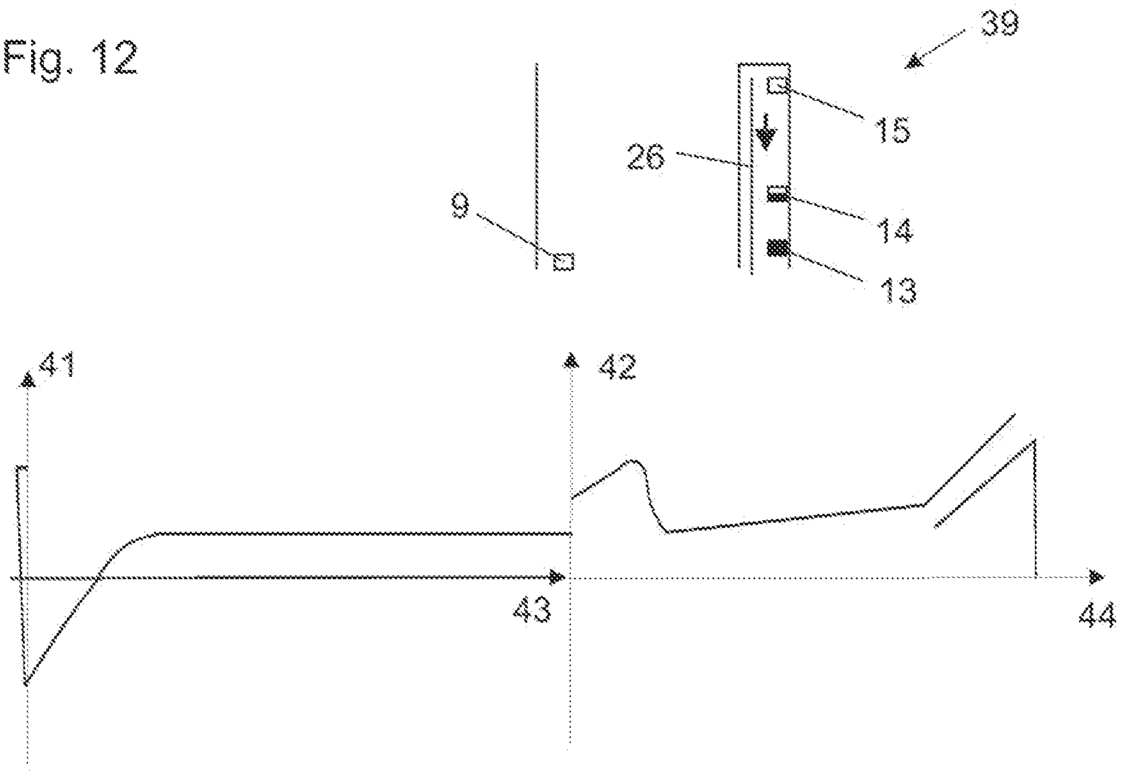
Figure 13:
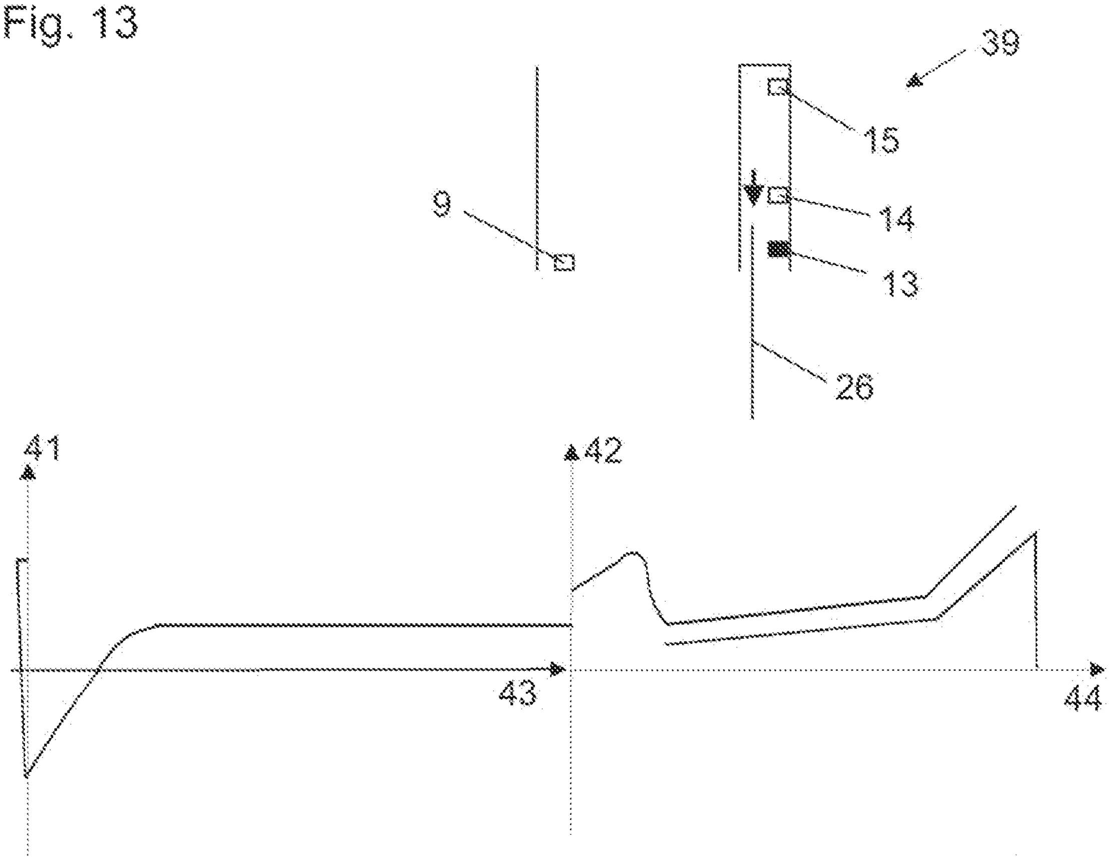

If the user of the piece of furniture 39 now wishes to move the door leaf 26 from the open position back to the closed position again, the door leaf 26 can be ejected in the direction of the partly open position in a fourth method step 16 by the second ejection device 15, which can be activated by an overpressing of the door leaf 26 in the direction of the end position. FIG. 11 shows the overpressed position in the cavity 6, and FIG. 12 shows an intermediate position in which the door leaf 26 is arranged immediately following the ejection in the cavity 6.

Figure 14:
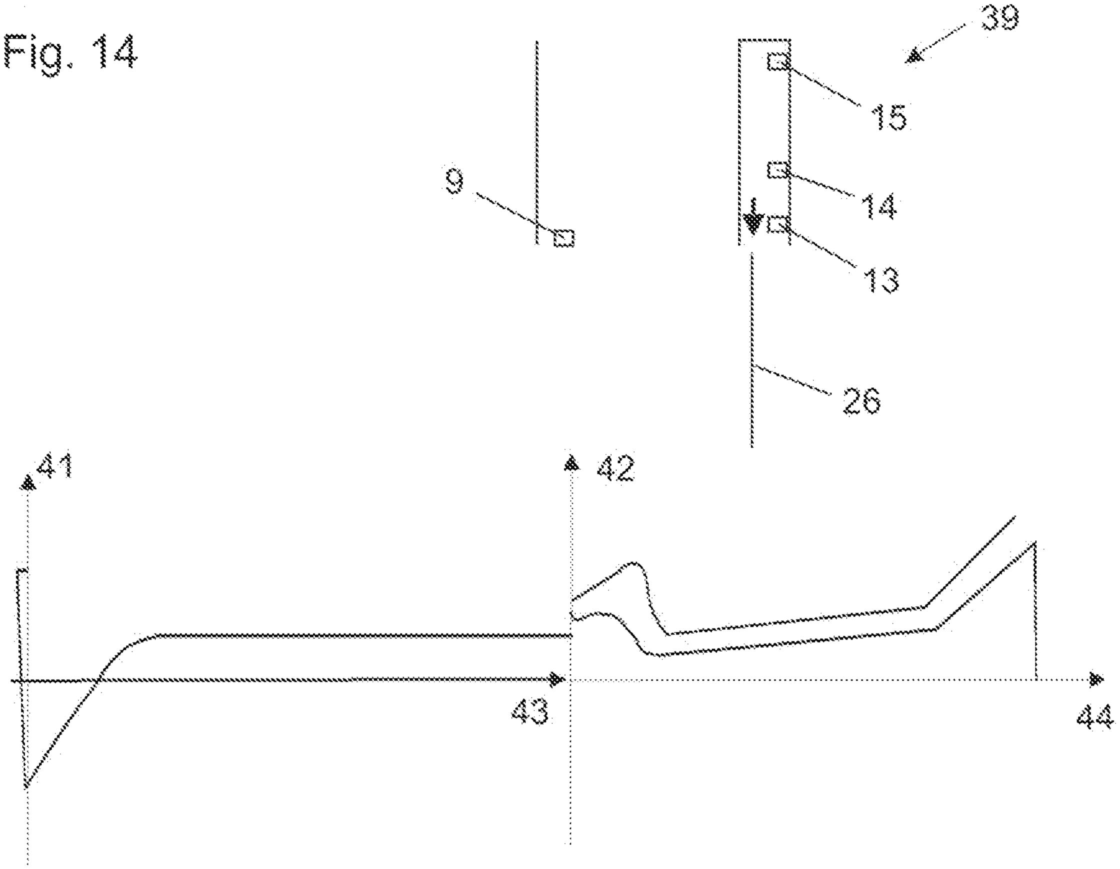

Starting from this intermediate position, the door leaf 26 is moved into the partly open position in a fifth method step 17 by the drive devices 13 and 14, namely successively by the drive device 14, which can also already be active during the ejection (see FIG. 13), and then by the drive device 13, by which the door leaf 26 is conveyed into the defined partly open position and the drive devices 13 and 14 become fully unloaded (see unfilled blocks in FIG. 14).

Figure 15:
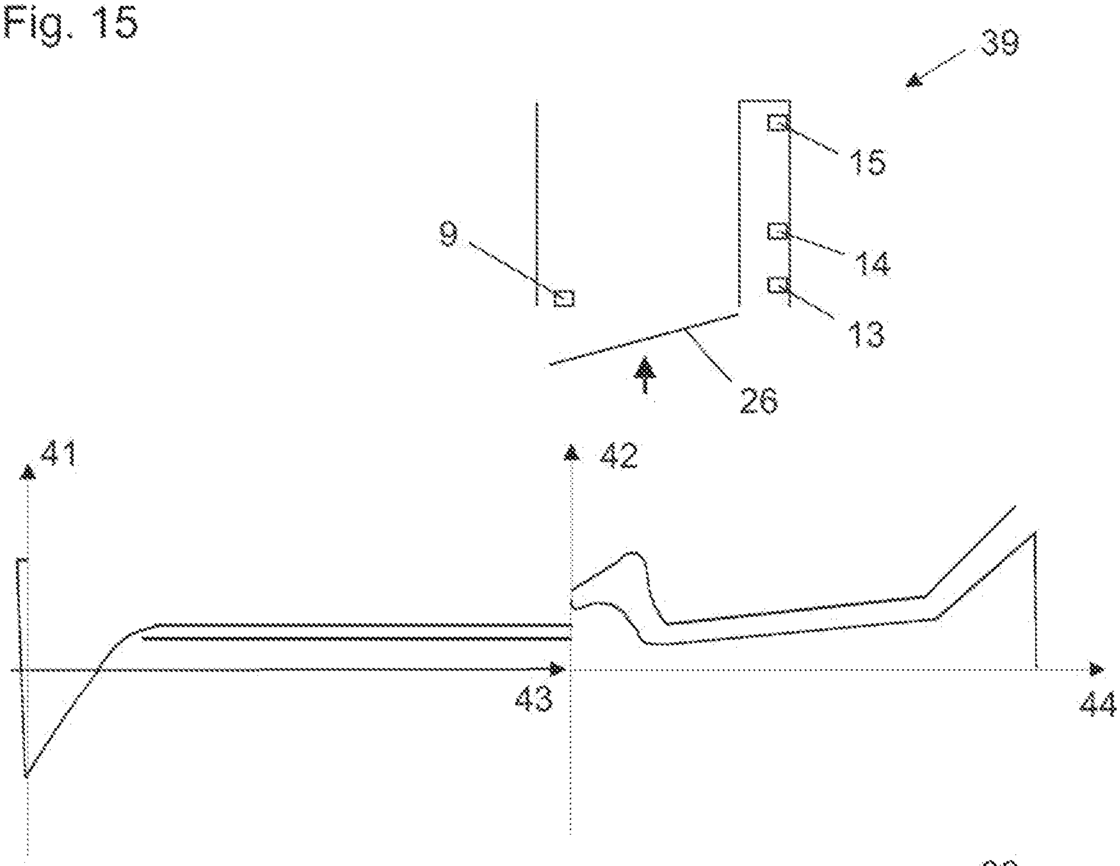
Figure 16:
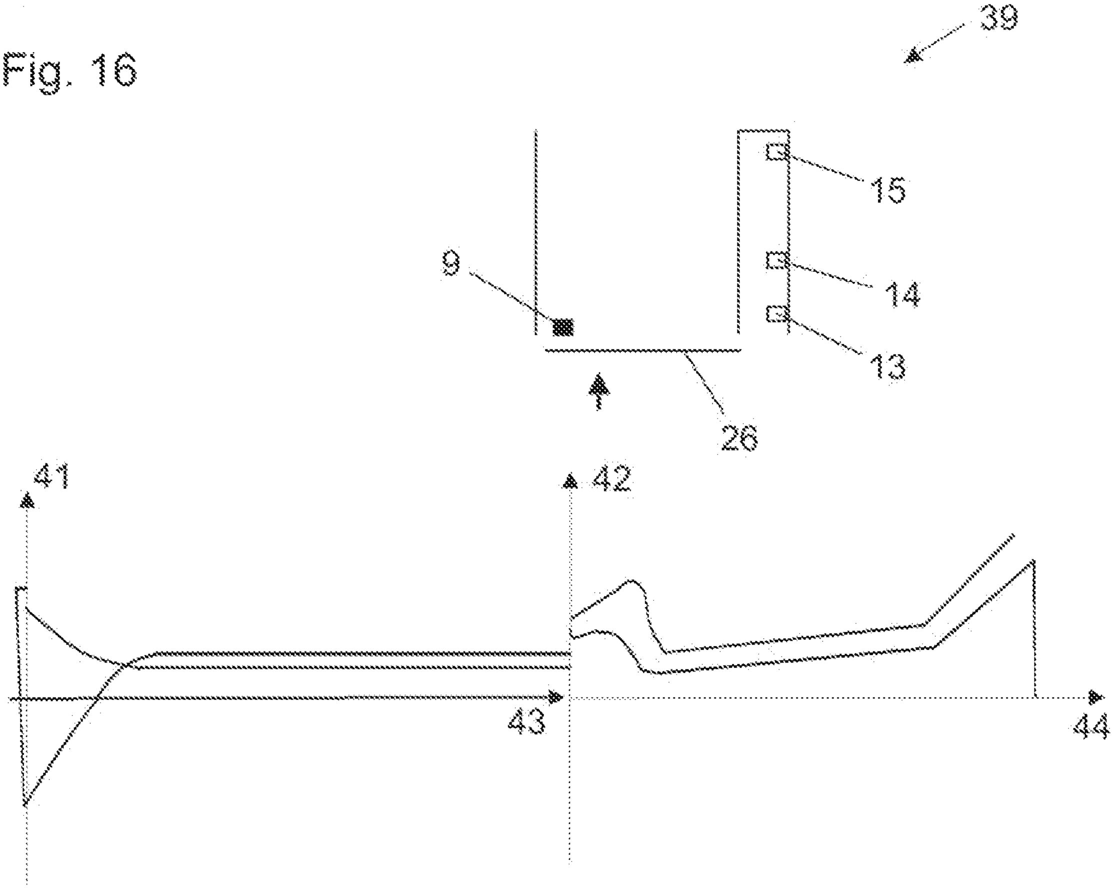

In a sixth method step 18, the door leaf 26 is moved manually from the partly open position to the closed position, wherein the first ejection device 9 is loaded in a last pivot angle area before reaching the closed position (see FIGS. 15 and 16).

The door leaf 26 is thus located in the starting position again and can be opened afresh.

FIGS. 17 to 30 show another embodiment of the method 1.

In this case the piece of furniture 38 comprises two door leaves 2, 3, which are connected to each other in an articulated manner. The piece of furniture 38 further comprises a receiving space 5 arranged between the side walls 27 and 28 and a cavity 6 arranged between the side walls 28 and 29.

Figure 17:
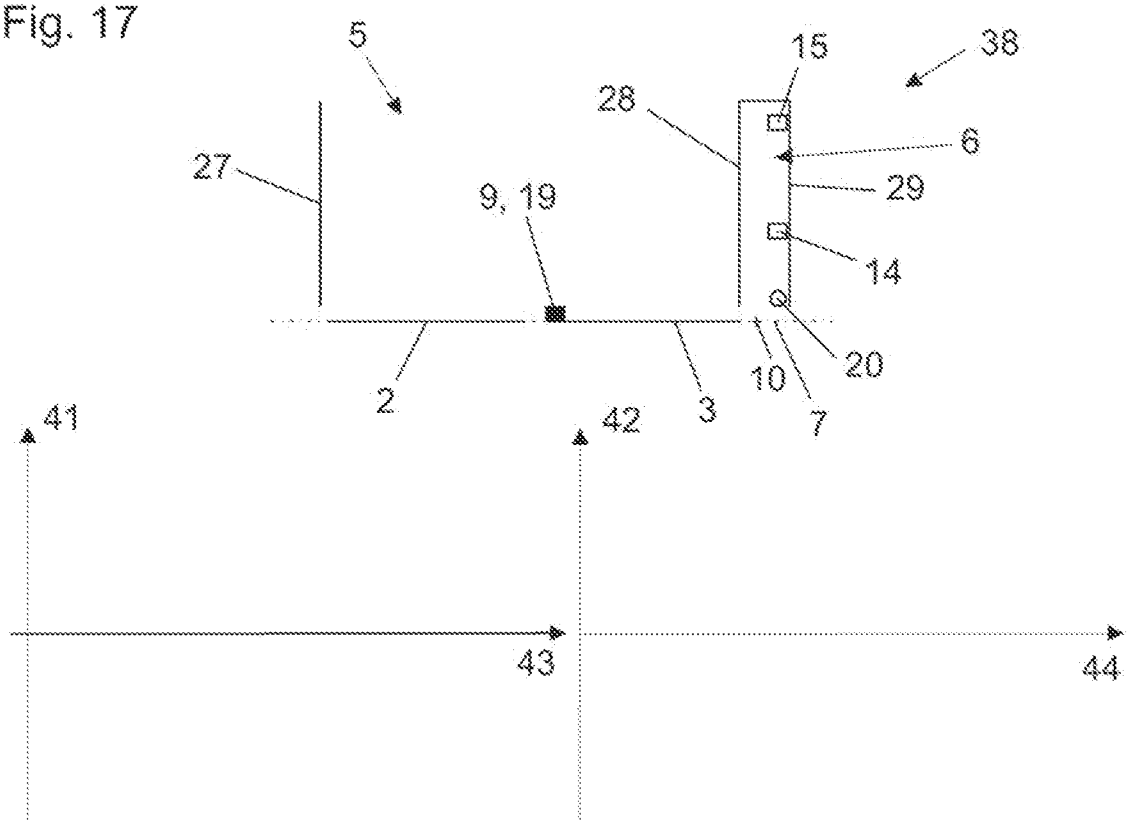
FIG. 17-30 show another embodiment of the method for moving a door leaf relative to a stationary furniture carcass, represented by a sequence of figures, wherein a piece of furniture is represented schematically in each case in a top view in an upper part of the figures and force-path diagrams are represented in a lower part.

In a first method step 8, the door leaves 2, 3 are pivoted away from the receiving space 5 about an axis of rotation 10, starting from the closed position represented in FIG. 17, by means of a first ejection device 9, which can be activated by an overpressing of the door leaves 2, 3 in the direction of the receiving space 5.

Figure 18:
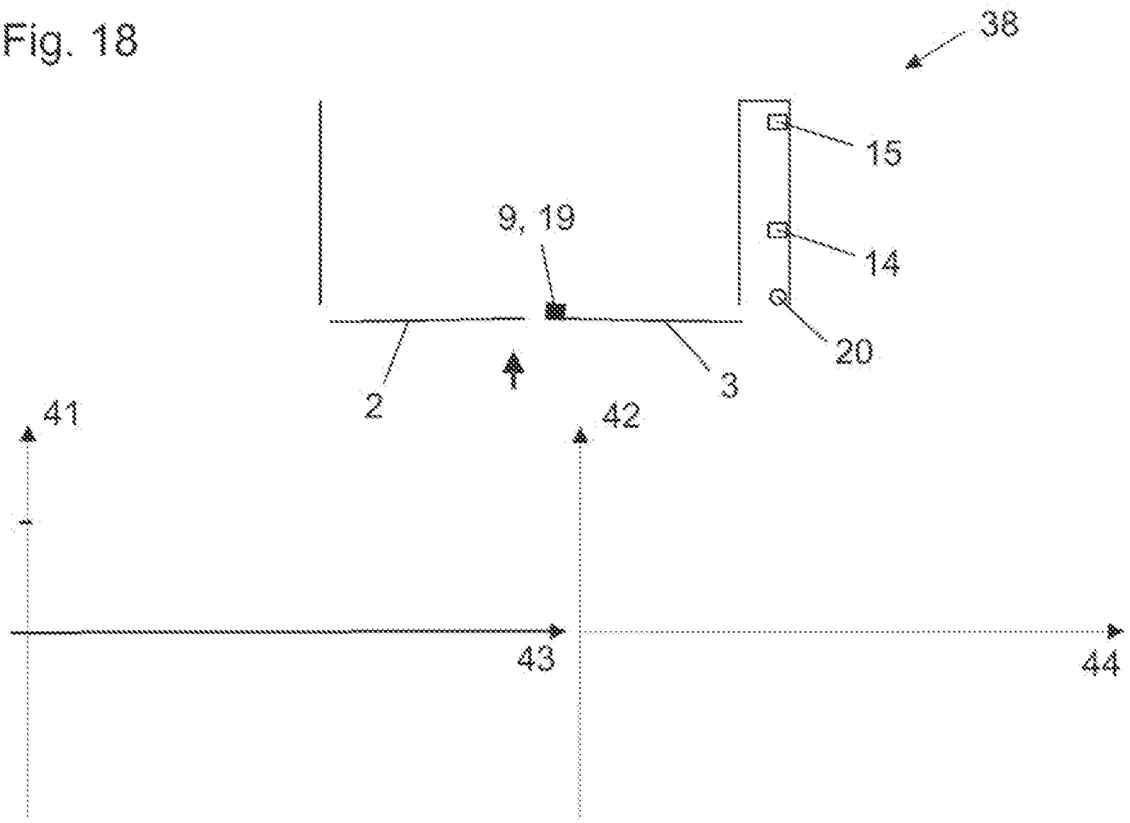
Figure 19:
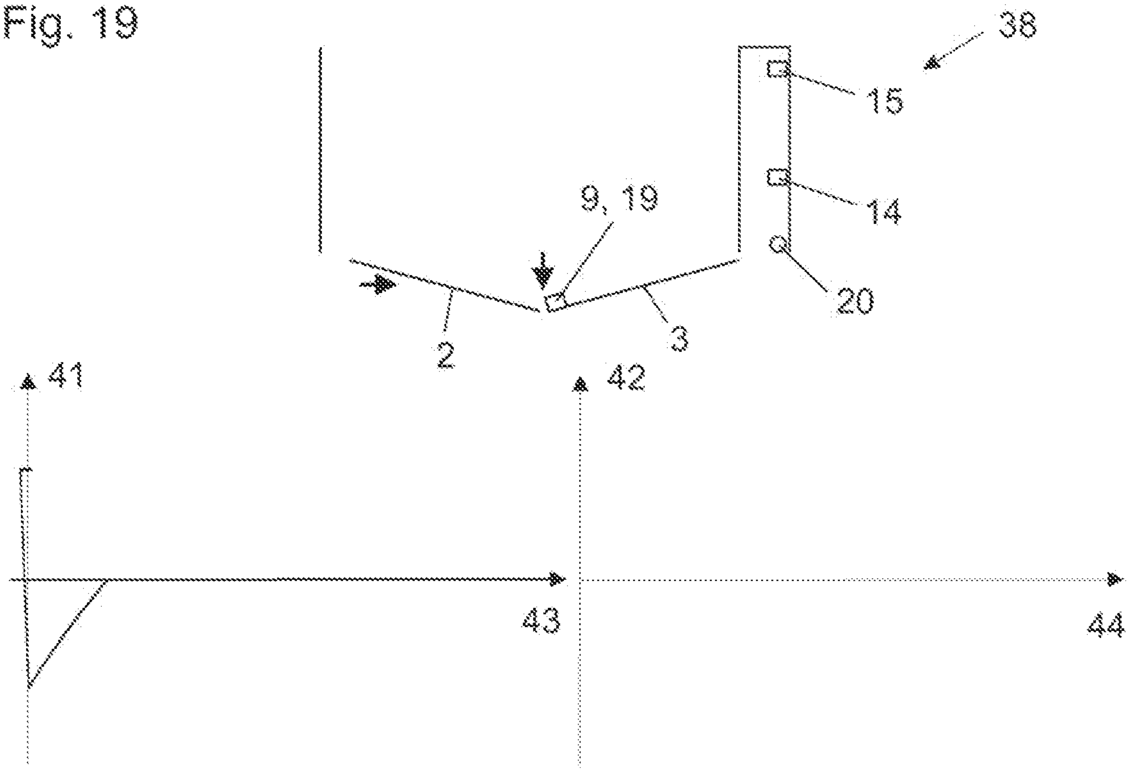

In this case, the first ejection device 9 is arranged on one of the door leaves 2, 3. The overpressed position is represented in FIG. 18 and the folded-out position assumed following the ejection is represented in FIG. 19.

In a second method step 11, the door leaves 2, 3 are moved into a partly open position in which the door leaves 2, 3 are arranged substantially transverse to the closing plane 7 and outside of the at least one cavity 6. The door leaves 2, 3 are also arranged substantially parallel to each other and effectively as a bundle.

Figure 20:
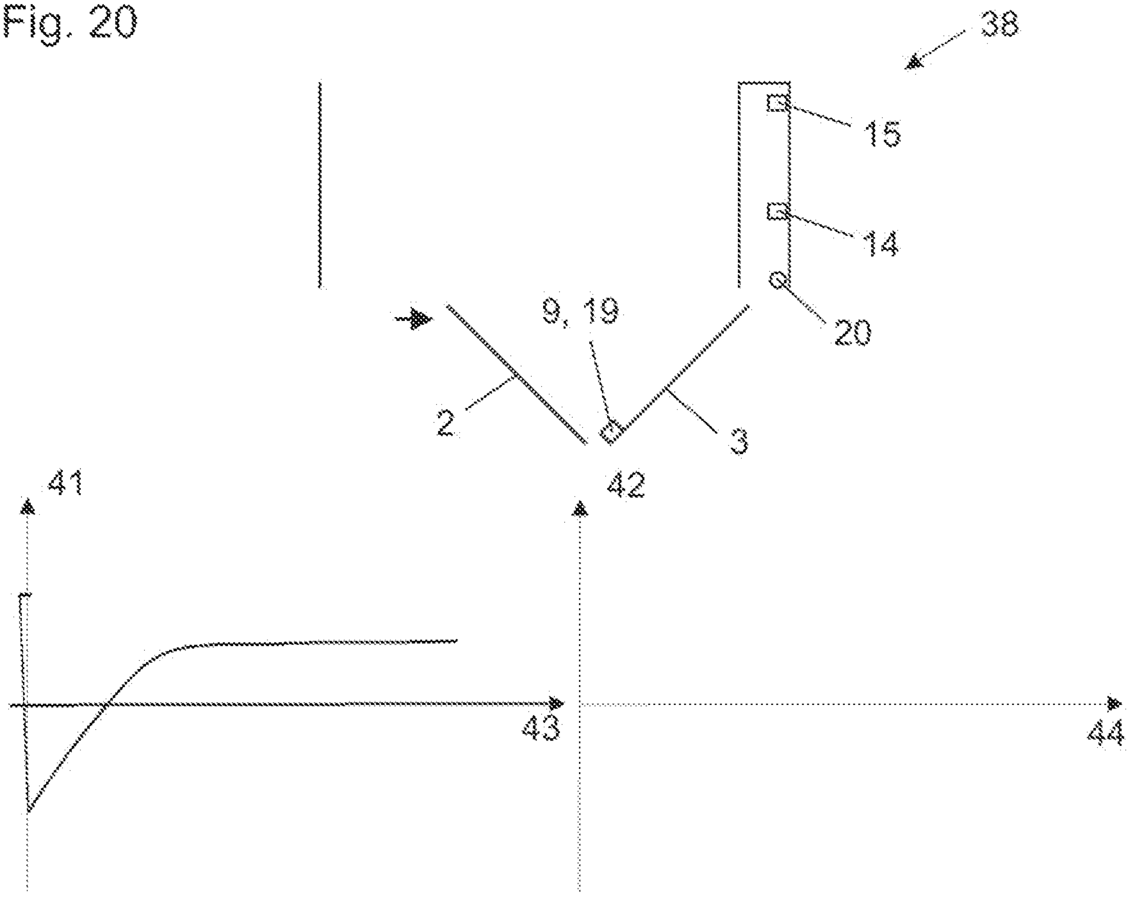
Figure 21:
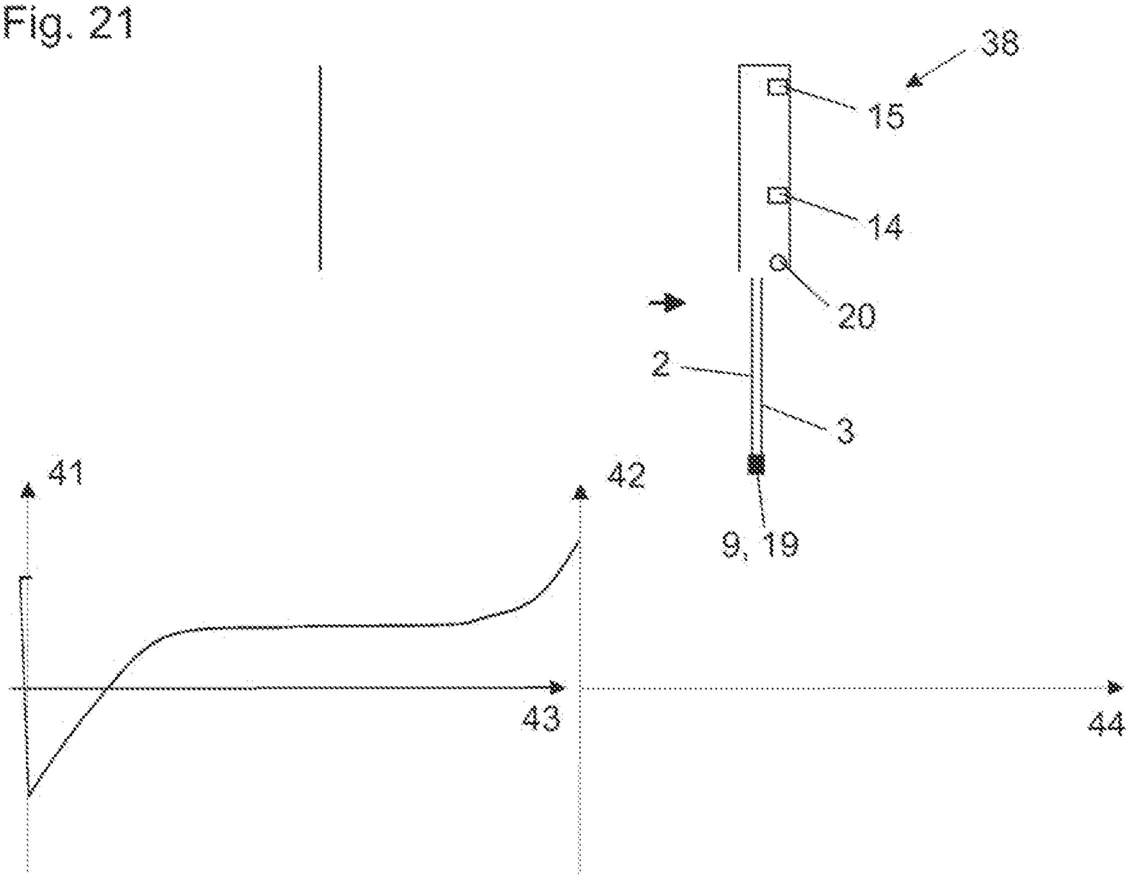

FIG. 20 shows an intermediate position. Both in the folded-out position assumed following the ejection and in the intermediate position, an energy store of the first ejection device 9 is unloaded. Up to the intermediate position, the method proceeds by analogy with the method according to FIGS. 4 to 16.

A difference takes effect as the process continues: in the case of the double-leaf arrangement, the first ejection device 9 is also designed as a pivot device 19 with which the door leaves 2, 3 can then be moved at a later time from the partly open position in the direction of the closed position again. In the course of the second method step 11, the pivot device 19 is now loaded during a continued movement from the intermediate position represented in FIG. 20 to the partly open position represented in FIG. 21, which is associated with an increase in force.

In a third method step 12, the door leaf bundle is moved manually from the partly open position to the open position, wherein a drive device 14 and a second ejection device 15 are loaded, preferably wherein the drive device 14 comprises a cable pull.

Figure 22:
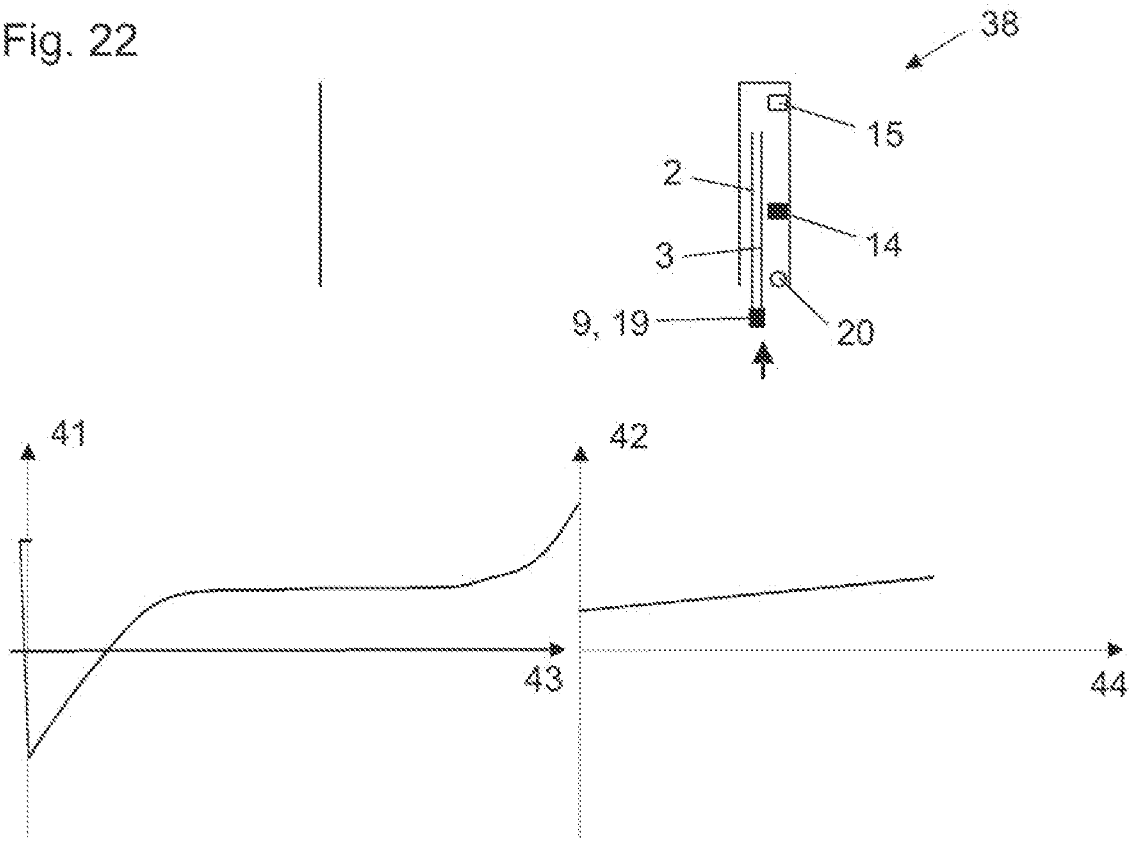
Figure 23:
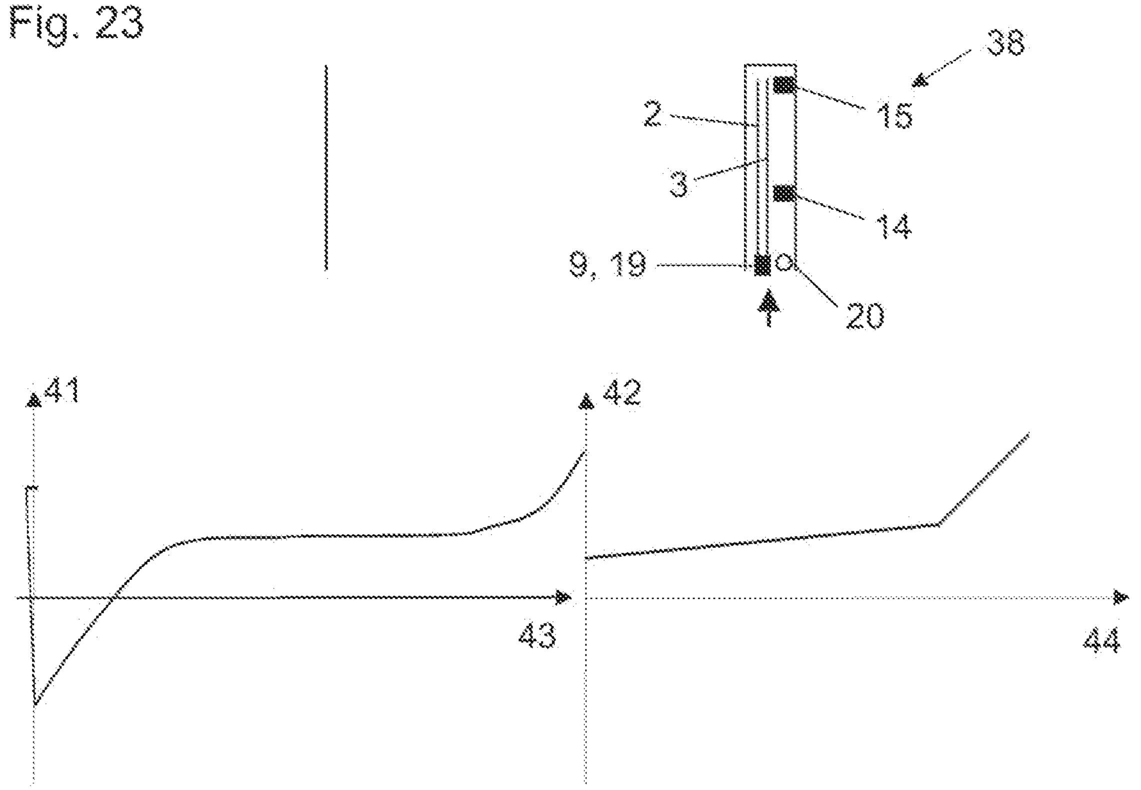

FIG. 22 shows an intermediate position of the door leaves 2, 3 in the cavity 6, in which position an energy store of the drive device 14 is loaded. FIG. 23 shows the end position, in which an energy store of the second ejection device 15 is also loaded.

Figure 24:
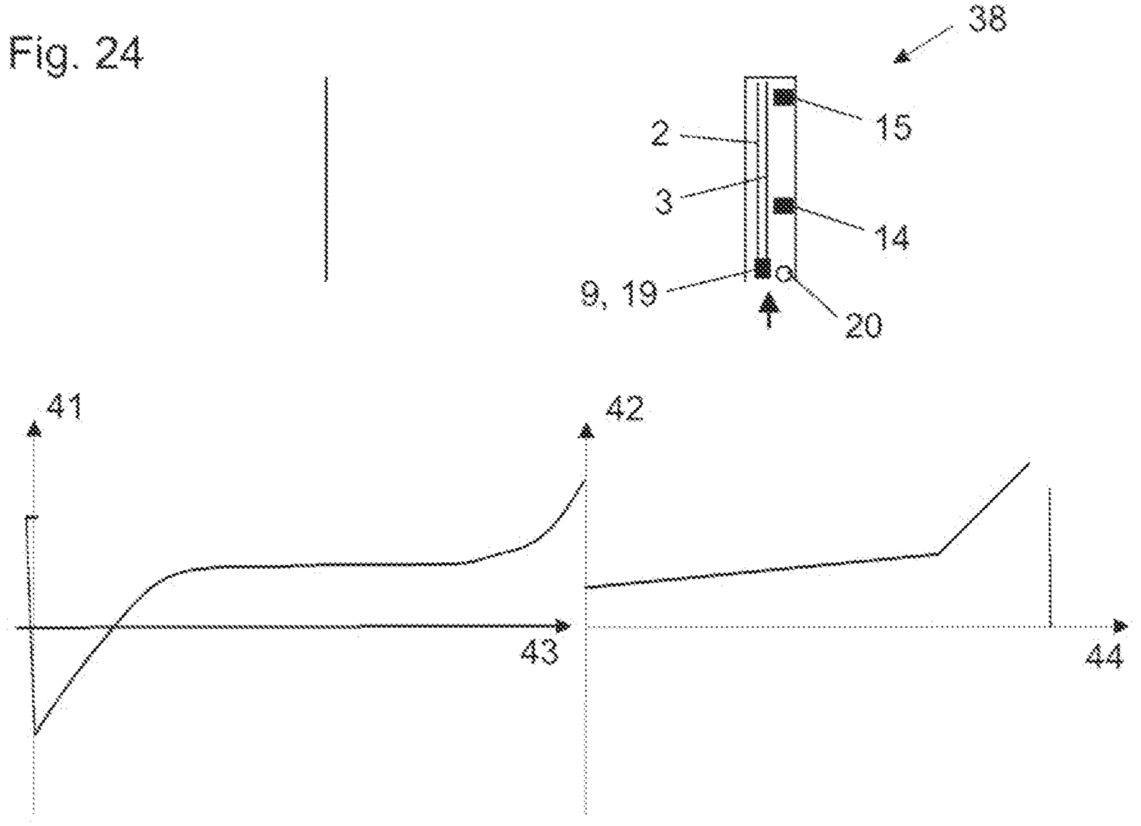
Figure 25:
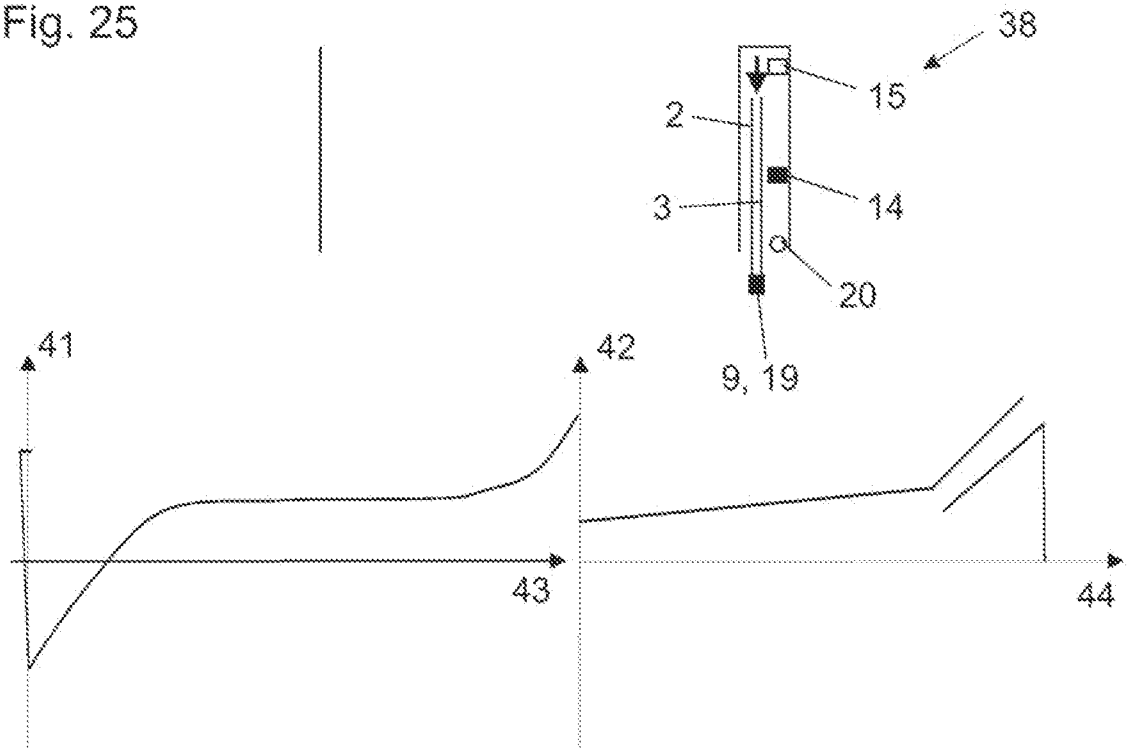
Figure 26:
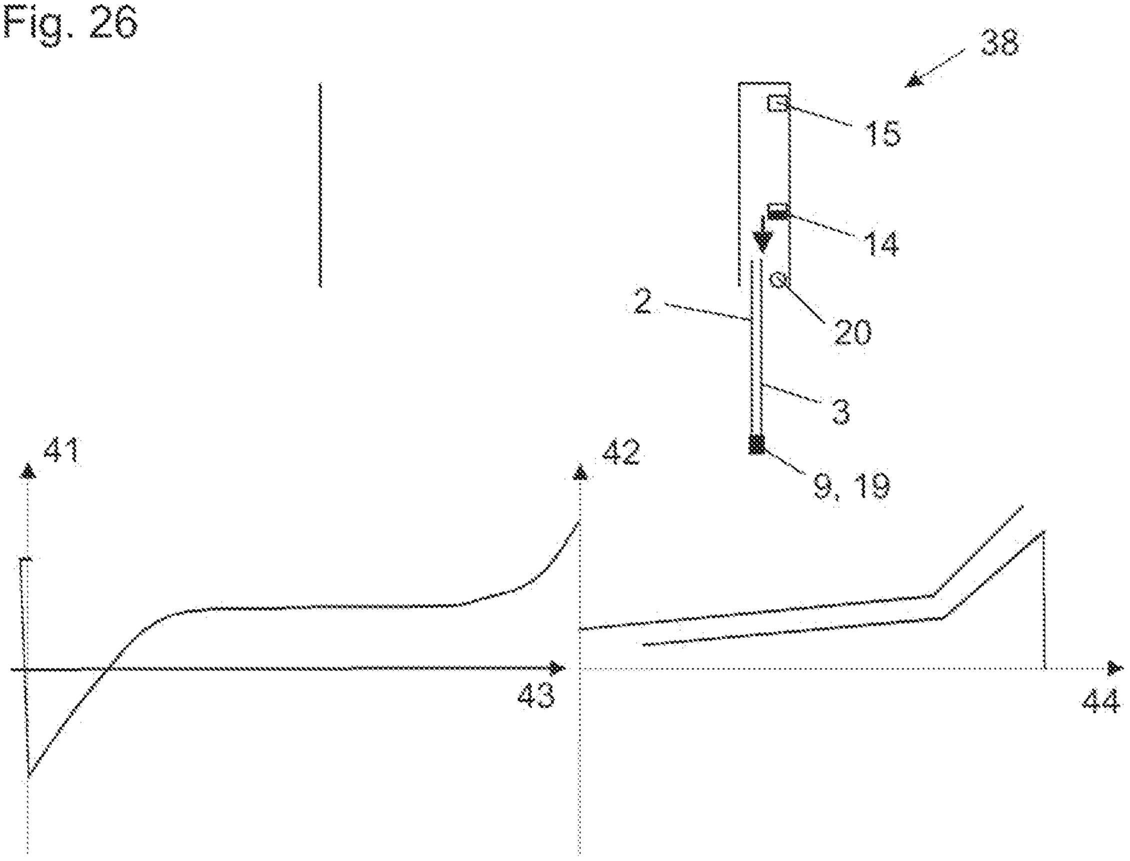

In a fourth method step 16, the door leaf bundle is ejected in the direction of the partly open position again, starting from the open position, by means of the second ejection device 15, which can be activated by an overpressing of the door leaf bundle in the direction of the end position. FIG. 24 shows the overpressed position and FIG. 25 an ejection position following completion of the ejection process.

In a fifth method step 17, the door leaves 2, 3 are moved into the partly open position by means of the drive device 14.

Figure 27:
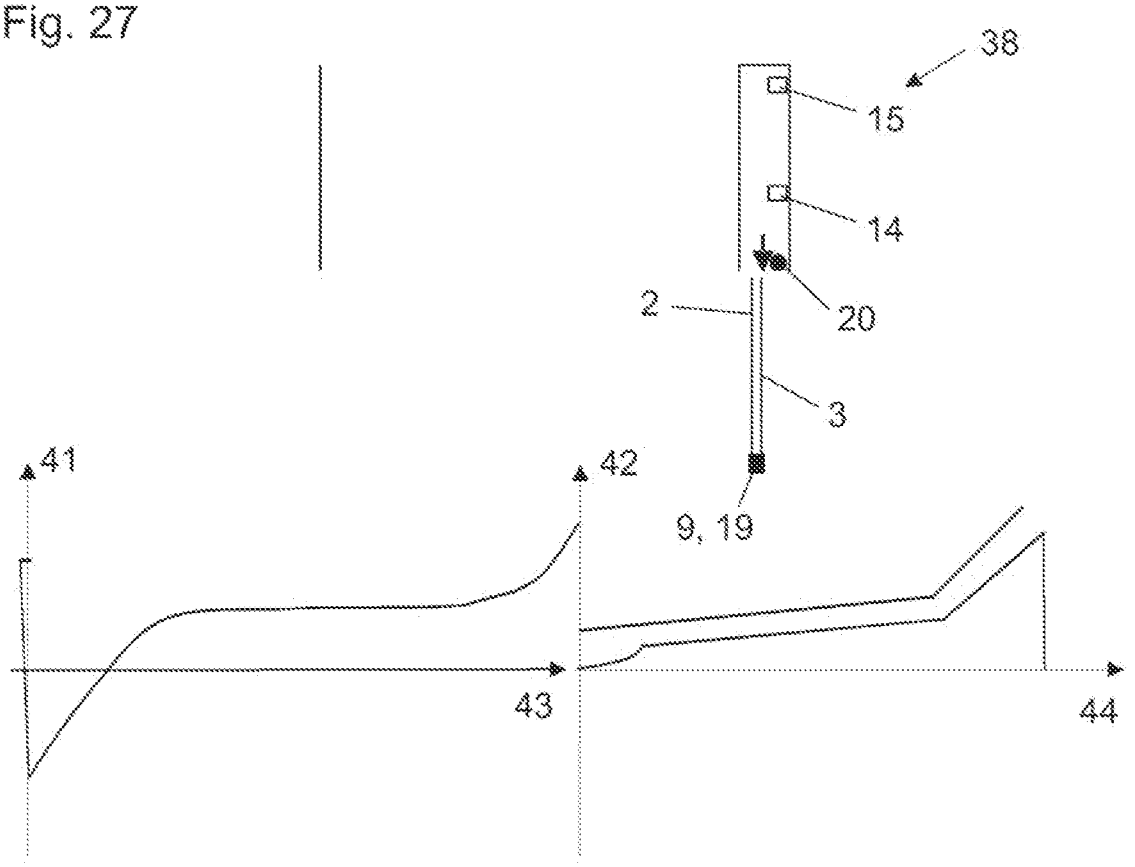

In this embodiment, at least one damping device 20 is provided, with which a movement of the door leaf bundle into the partly open position in the course of the fifth method step is damped, namely in a path section immediately upstream of the partly open position. This is represented in FIG. 27.

Figure 28:
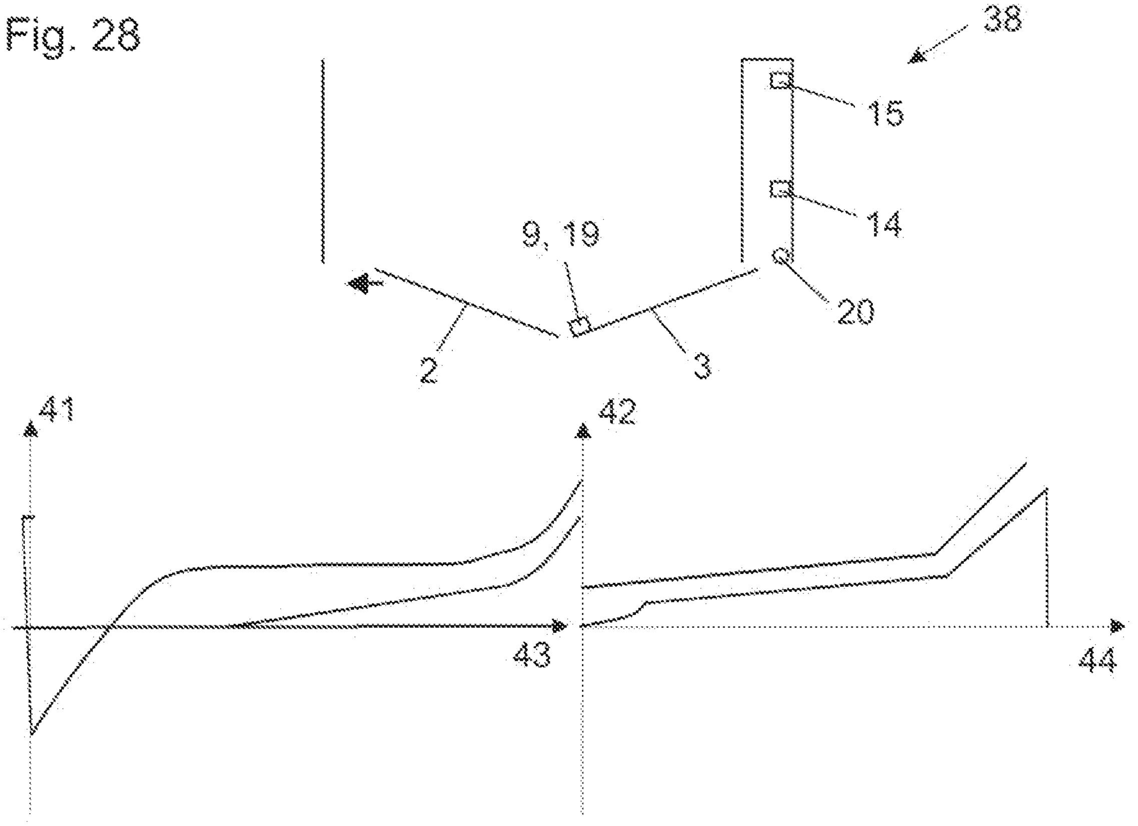
Figure 29:
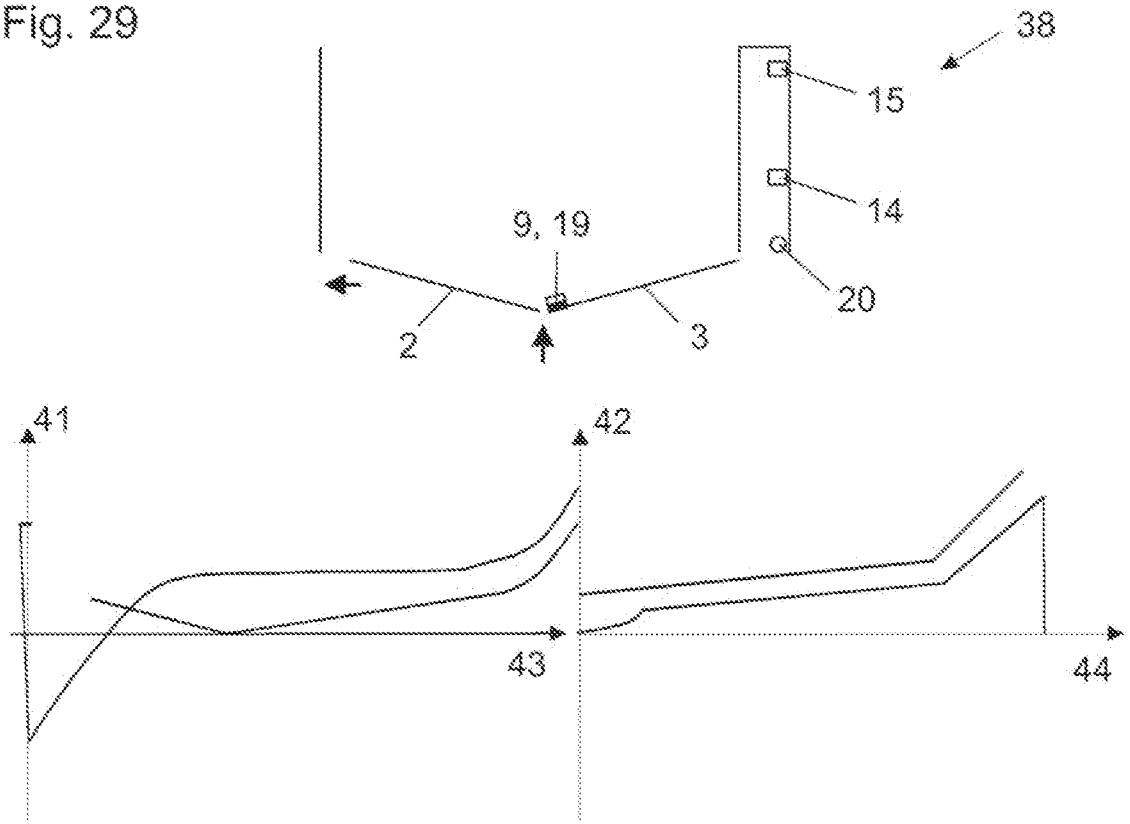
Figure 30:
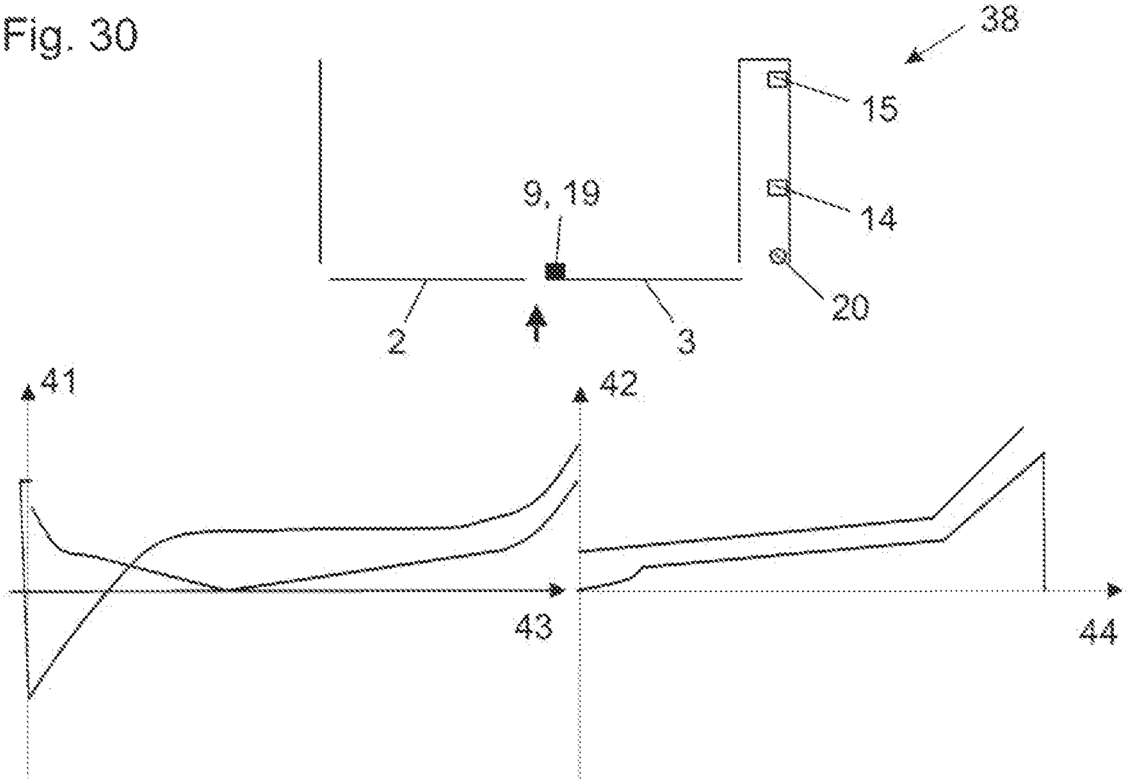

In a sixth method step 18, the door leaves 2, 3 are moved first by means of the pivot device 19 and then manually out of the partly open position into the closed position, wherein the first ejection device 9 is loaded in a last path section immediately upstream of the closed position (see FIGS. 28, 29 and 30).

In the closed position, which is represented in FIGS. 17 and 30, the door leaves 2, 3 are arranged in a coplanar position, and in the partly open position as well as the open position they are arranged substantially parallel to each other, and they perform a pivot-slide movement in the course of the first, second and sixth method step 8, 11, 18.

The invention claimed is:

1. A method of moving a door leaf relative to a stationary furniture carcass having a receiving space and a cavity, the door leaf being movable between a closed position, in which the door leaf is arranged in a closing plane and at least partially covers the receiving space, and an open position, in which the door leaf releases the receiving space and is arranged in an end position in the cavity, the method comprising:

- pivoting the door leaf away from the receiving space about an axis of rotation starting from the closed position by a first ejection device,
- after the pivoting of the door leaf, moving the door leaf into a partly open position in which a drive device is completely unloaded, the door leaf being arranged substantially transverse to the closing plane and outside of the cavity in the partly open position,
- after moving the door leaf into the partly open position, moving the door leaf out of the partly open position and into the open position during which the drive device and a second ejection device are loaded,
- after moving the door leaf into the open position, ejecting the door leaf in a direction toward the partly open position starting from the open position using the second ejection device,
- after ejecting the door leaf, moving the door leaf back into the partly open position using the drive device, and
- after moving the door leaf back into the partly open position, moving the door leaf from the partly open position to the closed position during which the first ejection device is loaded.

2. The method according to claim 1, wherein the first ejection device is configured as a pivot device to move the door leaf from the partly open position toward the closed position, the pivot device being loaded during the moving of the door leaf into the partly open position, and the door leaf being moved from the partly open position to the closed position using the pivot device and manually.

3. The method according to claim 1, further comprising damping a movement of the door leaf back into the partly open position by a damping device.

4. The method according to claim 1, wherein the door leaf is moved manually into the partly open position after the pivoting of the door leaf.

5. The method according to claim 1, wherein the door leaf is moved manually from the partly open position into the open position after moving the door leaf into the partly open position.

6. The method according to claim 1, wherein the pivoting of the door leaf away from the receiving space about the axis of rotation, the moving of the door leaf into the partly open position after the pivoting of the door leaf, and the moving of the door leaf from the partly open position to the closed position all comprise pivoting the door leaf.

7. The method according to claim 1, wherein the moving of the door leaf out of the partly open position and into the open position, the ejecting of the door leaf in the direction toward the partly open position, and the moving the door leaf back into the partly open position all comprise linearly moving the door leaf.

8. The method according to claim 7, wherein the door leaf is mounted on a support, and the support is displaced along a guide arranged in the cavity during the moving of the door leaf out of the partly open position and into the open position, the ejecting of the door leaf in the direction toward the partly open position, and the moving the door leaf back into the partly open position.

9. The method according to claim 1, wherein the door leaf is a first door leaf connected in an articulated manner to a second door leaf, the first and second door leaves being arranged in a coplanar position in the closed position and being arranged substantially parallel to each other in both the partly open position and the open position, and the first and second door leaves performing a pivot-slide movement during the pivoting of the door leaf away from the receiving space about the axis of rotation, the moving of the door leaf into the partly open position after the pivoting of the door leaf, and the moving of the door leaf from the partly open position to the closed position.

10. The method according to claim 9, wherein a running rail is arranged on the furniture carcass to be parallel to the closing plane, and one of the first and second door leaves is connected via a carriage to the running rail and is moved along the running rail during the pivoting of the door leaf away from the receiving space about the axis of rotation, the moving of the door leaf into the partly open position after the pivoting of the door leaf, and the moving of the door leaf from the partly open position to the closed position.

11. The method according to claim 1, wherein the drive device is one of at least two drive devices moving the door leaf successively and/or simultaneously into the partly open position during the moving of the door leaf back into the partly open position after ejecting the door leaf, and both of the drive devices are loaded during the moving of the door leaf out of the partly open position and into the open position.

12. The method according to claim 1, wherein the first ejection device is configured to be activated by an overpressing of the door leaf toward the receiving space.

13. The method according to claim 1, wherein the first ejection device is arranged on the furniture carcass or on the door leaf.

14. The method according to claim 1, wherein the drive device comprises a cable pull and/or a spring-loaded pivot lever.

15. The method according to claim 1, wherein the second ejection device is configured to be activated by an overpressing of the door leaf toward an end position beyond the open position.

16. The method according to claim 1, wherein the door leaf is moved from the partly open position to the closed position by a pivot device and/or manually.

17. The method according to claim 8, wherein the door leaf is pivotably mounted on the support.

* * * * *